(12) United States Patent
Sikder et al.

(10) Patent No.: US 10,417,413 B2
(45) Date of Patent: Sep. 17, 2019

(54) CONTEXT-AWARE INTRUSION DETECTION METHOD FOR SMART DEVICES WITH SENSORS

(71) Applicants: Amit Kumar Sikder, Miami, FL (US); Hidayet Aksu, Miami, FL (US); A. Selcuk Uluagac, Miami, FL (US)

(72) Inventors: Amit Kumar Sikder, Miami, FL (US); Hidayet Aksu, Miami, FL (US); A. Selcuk Uluagac, Miami, FL (US)

(73) Assignee: The Florida International University Board of Trustees, Miami, FL (US)

( * ) Notice: Subject to any disclaimer, the term of this patent is extended or adjusted under 35 U.S.C. 154(b) by 0 days.

(21) Appl. No.: 15/729,092

(22) Filed: Oct. 10, 2017

(65) Prior Publication Data
US 2019/0108330 A1    Apr. 11, 2019

(51) Int. Cl.
| | |
|---|---|
| *G06F 21/52* | (2013.01) |
| *G06F 21/44* | (2013.01) |
| *G06F 21/56* | (2013.01) |
| *G06F 21/55* | (2013.01) |
| *G06F 21/57* | (2013.01) |

(52) U.S. Cl.
CPC .............. *G06F 21/52* (2013.01); *G06F 21/44* (2013.01); *G06F 21/554* (2013.01); *G06F 21/566* (2013.01); *G06F 21/577* (2013.01)

(58) Field of Classification Search
CPC ........ G06F 21/52; G06F 21/554; G06F 21/44; G06F 21/566; G06F 21/577
See application file for complete search history.

(56) References Cited

U.S. PATENT DOCUMENTS

| | | |
|---|---|---|
| 4,206,449 A | 6/1980 | Galvin et al. |
| 6,801,878 B1 | 10/2004 | Hintz et al. |
| (Continued) | | |

FOREIGN PATENT DOCUMENTS

| | | |
|---|---|---|
| CN | 105956480 A | 9/2016 |
| KR | 1020060068518 A | 6/2006 |

OTHER PUBLICATIONS

IDC, "Smartphone Market Share—OS Data Overview", 2019, https://www.idc.com/promo/smartphone-market-share/os, 2 pages (Year: 2019).*

(Continued)

*Primary Examiner* — Jeffrey D. Popham
(74) *Attorney, Agent, or Firm* — Saliwanchik, Lloyd & Eisenschenk

(57) ABSTRACT

A smart device can include a data oriented sensor providing a numerical value, a logic oriented sensor providing a state, a sensor value collector connected to the data oriented sensor, a sensor logic state detector connected to the logic oriented sensor, a data processor connected to the sensor value collector and the sensor logic state detector, and a data analyzer connected to the data processor. The data processor can take the numerical value received from the sensor value collector, calculate an average value from the numerical value, sample the state receiving from the sensor logic state detector, and create an input matrix by using the average value and the sampled state. The data analyzer can receive the input matrix, train an analytical model, and check a data to indicate whether a state of the smart device is malicious or not.

16 Claims, 5 Drawing Sheets

(56) References Cited

U.S. PATENT DOCUMENTS

| | | | |
|---|---|---|---|
| 7,378,962 | B2 | 5/2008 | Odenwald et al. |
| 2006/0143439 | A1 | 6/2006 | Arumugam et al. |
| 2013/0305357 | A1 | 11/2013 | Ayyagari et al. |
| 2015/0286820 | A1* | 10/2015 | Sridhara ............... G06F 21/566 726/23 |
| 2016/0187426 | A1* | 6/2016 | Delaplagne .......... G01R 31/362 429/93 |
| 2017/0078848 | A1* | 3/2017 | Almarri ................ H04W 4/025 |

OTHER PUBLICATIONS

IDC, "Smartphone Market Share—Vendor Data Overview", 2019, https://www.idc.com/promo/smartphone-market-share/vendor, 3 pages (Year: 2019).*

Brooks et al., "Handbook of Markov Chain Monte Carlo", CRC Press, 2011, 620 pages (Year: 2011).*

Keilson, Julian, "Markov Chain Models—Rarity and Exponentiality", Springer-Verlag, 1979, 199 pages (Year: 1979).*

Uluagac et al., "Sensory Channel Threats to Cyber Physical Systems: A Wake-up Call", 2014, IEEE, pp. 301-309 (Year: 2014).*

Schmidt et al., "Static analysis of executables for collaborative malware detection on android," IEEE International Conference on Communications, Jun. 2009, pp. 1-5.

Shukla et al., "Beware, your hands reveal your secrets," Proceedings of the 2014 ACM SIGSAC Conference on Computer and Communications Security, Nov. 2014, pp. 1-14.

Simon et al., "PIN skimmer: inferring PINS through the camera and microphone," Proceedings of the Third ACM Workshop on Security and Privacy in Smartphones and Mobile Devices, Nov. 2013, pp. 1-12.

Smalley et al., "Security enhanced (SE) android: bringing flexible MAC to android," Proceedings of the 20th Annual Network and Distributed System Security Symposium, Feb. 2013, pp. 1-18.

Spreitzer, "PIN skimming: exploiting the ambient-light sensor in mobile devices," Proceedings of the 4th ACM Workshop on Security and Privacy in Smartphones and Mobile Devices, Nov. 2014, pp. 1-15.

Stankovic, "Wireless sensor networks," Semantic Scholar, Jun. 2006, pp. 1-20.

Strikos, "A full approach for intrusion detection in wireless sensor networks," School of Information and Communication Technology, Mar. 2007, pp. 1-8.

Subramanian et al., "Examining the characteristics and implications of sensor side channels," 2013 IEEE International Conference on Communications, Jun. 2013, pp. 1-6.

Sun et al., "Design and implementation of an android host-based intrusion prevention system," Proceedings of the 30th Annual Computer Security Applications Conference, Dec. 2014, pp. 1-10.

Tippenhauer et al., "On the requirements for successful GPS spoofing attacks," Proceedings of the 18th ACM Conference on Computer and Communications Security, Oct. 2011, pp. 1-12.

Uluagac et al., "Sensory channel threats to cyber physical systems: a wake-up call," 2014 IEEE Conference on Communications and Network Security, Oct. 2014, pp. 1-9.

Wang et al., "A novel hybrid mobile malware detection system integrating anomaly detection with misuse detection," Proceedings of the 6th International Workshop on Mobile Cloud Computing and Services, Sep. 2015, pp. 15-22.

Xu et al., "TapLogger: inferring user inputs on smartphone touchscreens using on-board motion sensors," Proceedings of the Fifth ACM Conference on Security and Privacy in Wireless and Mobile Networks, Apr. 2012, pp. 1-12.

Xu et al., "SemaDroid: a privacy-aware sensor management framework for smartphones," Proceedings of the Fifth ACM Conference on Data and Application Security and Privacy, Mar. 2015, pp. 1-12.

Ye, "A markov chain model of temporal behavior for anomaly detection," Proceedings of the 2000 IEEE Workshop on Information Assurance and Security, Jun. 2000, pp. 171-174.

Ye et al., "IMDS: intelligent malware detection system," Proceedings of the 13th ACM SIGKDD International Conference on Knowledge Discovery and Data Mining, Aug. 2007, pp. 1043-1047.

Zhuang et al., "Keyboard acoustic emanations revisited," ACM Transactions on Information and Systems Security, Oct. 2009, pp. 1-26, vol. 13, No. 1.

Smith, "U.S. Smartphone use in 2015," Pew Research Center, Apr. 2015, pp. 1-5, http://www.pewinternet.org/2015/04/01/us-smartphone-use-in-2015/.

Smith, "Chapter three: a 'week in the life' analysis of smartphone users," Pew Research Center, Apr. 2015, pp. 1-10, http://www.pewinternet.org/2015/04/01/chapter-three-a-week-in-the-life-analysis-of-smartphone-users/.

Radzikowski, "Analyzing the power consumption of mobile antivirus software on android devices," Dr. Shem, Nov. 2015, pp. 1-7, http://drshem.com/2015/11/08/analyzing-the-power-consumption-of-mobile-antivirus-software-on-android-devices/.

"Android antivirus protection: security steps you should take," Norton, Sep. 2016, https://us.norton.com/Android-Anti-Virus-Protection/article.

Al-Haiqi et al., "Keystrokes inference attack on android: a comparative evaluation of sensors and their fusion," Journal of ICT Research and Applications, Nov. 2013, pp. 117-136, vol. 7, No. 2.

Asonov et al., "Keyboard acoustic emanations," IEEE Symposium on Security and Privacy, May 2004, pp. 1-9.

Aviles-Arriaga et al., "A comparison of dynamic naive bayesian classifiers and hidden markov models for gesture recognition," Journal of Applied Research and Technology, Apr. 2011, pp. 81-102, vol. 9, No. 1.

Aviv et al., "Practicality of accelerometer side channels on smartphones," Proceedings of the 28th Annual Computer Security Applications Conference, Dec. 2012, pp. 1-10.

Bugiel et al., "Practical and lightweight domain isolation on android," Proceedings of the First ACM Workshop on Security and Privacy in Smartphones and Mobile Devices, Oct. 2011, pp. 1-12.

Cai et al., "TouchLogger: inferring keystrokes on touch screen from smartphone motion," Proceedings of the 6th USENIX Conference on Hot Topics in Security, Dec. 2011, pp. 1-6.

Cai et al., "On the practicality of motion based keystroke inference attack," Proceedings of the 5th International Conference on Trust and Trustworthy Computing, Jun. 2012, pp. 1-18.

Chan et al., "Smart homes—current features and future perspectives," Maturitas, Oct. 2009, pp. 90-97, vol. 64.

Coffed, "The threat of GPS jamming: the risk to an information utility," Harris Corporation, Jul. 2011, pp. 1-12.

Dahl et al., "Large-scale malware classification using random projections and neural networks," Proceedings of the IEEE International Conference on Acoustics, Speech and Signal Processing, May 2013, pp. 1-5.

Diao et al., "Your voice assistant is mine: how to abuse speakers to steal information and control your phone," Proceedings of the 4th ACM Workshop on Security and Privacy in Smartphones and Mobile Devices, Nov. 2014, pp. 1-12.

Enck et al., "TaintDroid: an information-flow tracking system for realtime privacy monitoring on smartphones," ACM Transactions on Computer Systems, Jun. 2014, pp. 1-15, vol. 32, No. 2.

Farooqi et al., "A novel intrusion detection framework for wireless sensor networks," Personal and Ubiquitous Computing, Jun. 2012, pp. 1-13.

Kune et al., "Timing attacks on PIN input devices," Proceedings of the 17th ACM Conference on Computer and Communications Security, Oct. 2010, pp. 678-680.

Gu et al., "BotHunter: detecting malware infection through ids-driven dialog correlation," Proceedings of the 16th USENIX Security Symposium, Aug. 2007, pp. 1-16.

Halevi et al., "A closer look at keyboard acoustic emanations: random passwords, typing styles and decoding techniques," Proceedings of the 7th ACM Symposium on Information, Computer and Communications Security, May 2012, pp. 1-7.

Hall et al., "The WEKA data mining software: an update," ACM SIGKDD Explorations Newsletter, Jun. 2009, pp. 10-18, vol. 11, No. 1.

Hasan et al., "Sensing-enabled channels for hard-to-detect command and control of mobile devices," Proceedings of the 8th ACM

(56) References Cited

OTHER PUBLICATIONS

SIGSAC Symposium on Information, Computer and Communications Security, May 2013, pp. 1-12.
Hilty et al., "A policy language for distributed usage control," Proceedings of the 12th European Conference on Research in Computer Security, Sep. 2007, pp. 1-16.
Ioannis et al., "Towards intrusion detection in wireless sensor networks," Proceedings of the 13th European Wireless Conference, Apr. 2007, pp. 1-10.
Jana et al., "A scanner darkly: protecting user privacy from perceptual applications," 2013 IEEE Symposium on Security and Privacy, May 2013, pp. 349-363.
Jang et al., "A11y attacks: exploiting accessibility in operating systems," Proceedings of the 2014 ACM SIGSAC Conference on Computer and Communications Security, Nov. 2014, pp. 1-13.
Jha et al., "Markov chains, classifiers, and intrusion detection," Proceedings of the 14th IEEE Workshop on Computer Security Foundations, Jun. 2001, pp. 1-14.
Persial et al., "Side channel attack-survey," International Journal of Advanced Scientific Research and Review, 2011, pp. 54-57, vol. 1, No. 4.
Kruegel et al., "Bayesian event classification for intrusion detection," Proceedings of the 19th Annual Computer Security Applications Conference, Dec. 2003, pp. 1-10.
Lane et al., "A survey of mobile phone sensing," IEEE Communications Magazine, Sep. 2010, pp. 140-150.
Lane et al., "Enabling large-scale human activity inference on smartphones using community similarity networks (CSN)," Proceedings of the 13th International Conference on Ubiquitous Computing, Sep. 2011, pp. 355-364.
Lei et al., "A threat to mobile cyber-physical systems: sensor-based privacy theft attacks on android smartphones," 2013 12th IEEE International Conference on Trust, Security and Privacy in Computing and Communications, Jul. 2013, pp. 126-133.
Linda et al., "Neural network based intrusion detection system for critical infrastructures," 2009 International Joint Conference on Neural Networks, Jul. 2009, pp. 1-9.
Macias et al., "Mobile sensing systems," Sensors, Dec. 2013, pp. 17292-17321, vol. 13.
Maiti et al., "(Smart)Watch your taps: side-channel keystroke inference attacks using smartwatches," Proceedings of the 2015 ACM International Symposium on Wearable Computers, Sep. 2015, pp. 27-30.
Meng et al., "Charging me and I know your secrets! Towards juice filming attacks on smartphones," Proceedings of the First ACM Workshop on Cyber-Physical System Security, Apr. 2015, pp. 1-10.
Michalevsky et al., "Gyrophone: recognizing speech from gyroscope signals," Proceedings of the 23rd USENIX Security Symposium, Aug. 2014, pp. 1053-1067.
Milette et al., Professional Android Sensor Programming, May 2012, John Wiley & Sons, Inc., Indianapolis, Indiana.
Miluzzo et al., "TapPrints: your finger taps have fingerprints," Proceedings of the 10th International Conference on Mobile Systems, Applications and Services, Jun. 2012, pp. 1-14.
Molay et al., "Learning characteristics of smartphone users from accelerometer and gyroscope data," Semantic Scholar, 2013, pp. 1-5.
Mukherjee et al., "Intrusion detection using naive bayes classifier with feature reduction," Procedia Technology, Feb. 2012, pp. 119-128, vol. 4.
Murphy, "Naive bayes classifiers," Semantic Scholar, Oct. 2006, pp. 1-8.
Narain et al., "Single-stroke language-agnostic keylogging using stereo-microphones and domain specific machine learning," Proceedings of the 2014 ACM Conference on Security and Privacy in Wireless and Mobile Networks, Jul. 2014, pp. 1-12.
Nguyen, "Using unrestricted mobile sensors to infer tapped and traced user inputs," Theses and Dissertations, Columbus State University ePress, May 2015, pp. iii-52.
Owusu et al., "ACCessory: password inference using accelerometers on smartphones," Proceedings of the 12th Workshop on Mobile Computing Systems and Applications, Feb. 2012, pp. 1-6.
Panda et al., "Network intrusion detection using naive bayes," IJCSNS International Journal of Computer Science and Network Security, Dec. 2007, pp. 258-263, vol. 7, No. 12.
Petracca et al., "AuDroid: preventing attacks on audio channels in mobile devices," Proceedings of the 31st Annual Computer Security Applications Conference, Dec. 2015, pp. 1-10.
Roesner et al., "User-driven access control: rethinking permission granting in modern operating systems," 2012 IEEE Symposium on Security and Privacy, May 2012, pp. 224-238.
Sahs et al., "A machine learning approach to android malware detection," 2012 European Intelligence and Security Informatics Conference, Aug. 2012, pp. 141-147.
Schlegel et al., "Soundcomber: a stealthy and context-aware sound trojan for smartphones," Proceedings of the 18th Annual Network and Distributed System Security Symposium, Feb. 2011, pp. 1-17.
Mohamed et al., "SMASheD: sniffing and manipulating android sensor data for offensive purposes," IEEE Transactions on Information Forensics and Security, Apr. 2017, pp. 901-913, vol. 12, No. 4.
Park et al., "The effect of users' characteristics and experiential factors on the compulsive usage of the smartphone," International Conference on Ubiquitous Computing and Multimedia Applications, Apr. 2011, pp. 438-446.
Peiravian et al., "Machine learning for android malware detection using permission and API calls," 2013 IEEE 25th International Conference on Tools with Artificial Intelligence, Nov. 2013, pp. 300-305.
Ping et al., "TextLogger: inferring longer inputs on touch screen using motion sensors," Proceedings of the 8th ACM Conference on Security and Privacy in Wireless and Mobile Networks, Jun. 2015, pp. 1-12.
Pongaliur et al., "Securing sensor nodes against side channel attacks," 2008 11th IEEE High Assurance Systems Engineering Symposium, Dec. 2008, pp. 353-361.
Poslad, Ubiquitous Computing: Smart Devices, Environments and Interactions, Mar. 2009, pp. 1-40, John Wiley & Sons Ltd.
Shen et al., "Input extraction via motion-sensor behavior analysis on smartphones," Computers and Security, Sep. 2015, pp. 143-155, vol. 53.
Wu et al., "DroidDolphin: a dynamic android malware detection framework using big data and machine learning," Proceedings of the 2014 Conference on Research in Adaptive and Convergent Systems, Oct. 2014, pp. 247-252.
Yu et al., "The exploration in the education of professionals in applied internet of things engineering," 2010 4th International Conference on Distance Learning and Education, Oct. 2010, pp. 74-77.
Yu et al., "A framework of machine learning based intrusion detection for wireless sensor networks," 2008 IEEE International Conference on Sensor Networks, Ubiquitous, and Trustworthy Computing, Jun. 2008, pp. 272-279.

* cited by examiner

CONTEXT-AWARE INTRUSION DETECTION METHOD FOR SMART DEVICES WITH SENSORS

STATEMENT OF GOVERNMENT SUPPORT

This invention was made with government support under CNS-1453647 awarded by National Science Foundation. The government has certain rights in the invention.

BACKGROUND

Smart devices, such as smartphones and wearables, have become omnipresent in every aspect of human life. Nowadays, the role of smart devices is not limited to making phone calls and messaging only. They are integrated into various applications from home security to health care to military [15], [57], [67]. Since smart devices seamlessly integrate the physical world with the cyber world via their sensors (e.g., light sensor, accelerometer, and gyroscope), they provide more efficient and user-friendly applications [34], [38], [79], [52], [45]. On the other hand, while the number of applications using different sensors [35] is increasing and new devices offer more sensors, the presence of sensors has opened novel ways to exploit the smart devices [72]. Attackers can exploit the sensors in many different ways. For example, they can: trigger existing malware on a device with a simple flashlight [25]; use a sensor (e.g., light sensor) to leak sensitive information by using motion sensors such as an accelerometer and a gyroscope; or record or steal sensitive information from other nearby devices (e.g., computers, keyboards) or people [8], [81], [23], [39]. They can even transfer specific malware using sensors as a communication channel [72]. Such sensor-based threats have become more serious with the rapid growth of apps utilizing many sensors [4].

BRIEF SUMMARY

Embodiments of the subject invention provide a novel and advantageous Intrusion Detection System (IDS) framework that enhances security of smart devices by observing changes in sensor data for different tasks and creating a contextual model, thereby distinguishing benign and malicious behavior on the sensors.

In an embodiment, a context-aware intrusion detector can comprise: a sensor including a no-permission imposed sensor and a permission imposed sensor; a sensor data collector receiving a numerical value from the no-permission imposed sensor and receiving a state from the permission imposed sensor; a data processor merging the numerical value and the state, and creating an input matrix; and a data analyzer differentiating a malicious behavior from a normal behavior based on the input matrix.

In another embodiment, a context-aware intrusion detection method can comprise: providing a numerical value from a no-permission imposed sensor; providing a state from a permission imposed sensor; receiving the numerical value and the state by a sensor data collector; merging the numerical value and the state by a data processor; creating an input matrix by the data processor; and determining a malicious behavior based on the input matrix by a data analyzer.

In yet another embodiment, a smart device can comprise: a data oriented sensor providing a numerical value; a logic oriented sensor providing a state; a sensor data collector including a sensor value collector connected to the data oriented sensor and a sensor logic state detector connected to the logic oriented sensor; a data processor connected to the sensor data collector; and a data analyzer connected to the data processor. The data processor can take the numerical value receiving from the sensor value collector, calculate an average value from the numerical value, sample the state receiving from the sensor logic state detector, and create an input matrix by using the average value and the sampled state. The data analyzer can receive the input matrix, train an analytical model, and check a data to indicate whether a state of the smart device is malicious or not.

DETAILED DESCRIPTION

Figure 1:
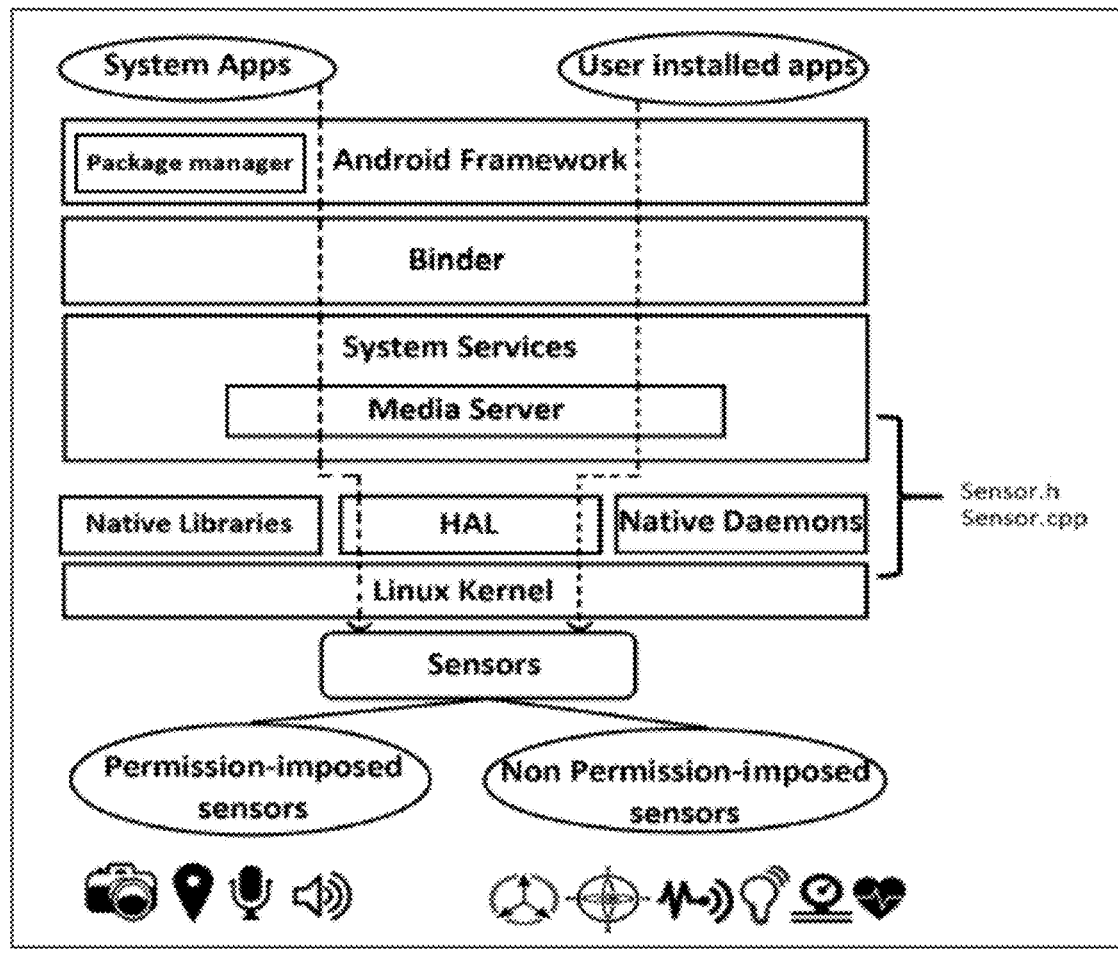
FIG. 1 shows Android sensor management architecture.

Embodiments of the subject invention provide a novel and advantageous Intrusion Detection System (IDS) framework that enhances security of smart devices by observing changes in sensor data for different tasks and creating a contextual model, thereby distinguishing benign and malicious behavior on the sensors.

Smart devices such as smart phones, smart watches, smart locks, fitness bands, smart TVs, home automation systems, and sensor-based robots have become omnipresent in every aspect of human life. The role of these smart devices is not limited to making simple phone calls and messaging only. They are integrated in every application domain from home security to health care to military. One of the main reasons behind this is the ability of these smart devices to almost seamlessly integrate the physical world with the cyber one via their sensors (e.g., light sensor, accelerometer, gyroscope, audio sensor, and proximity sensor) on-board for more efficient and user-friendly applications. Nearly all the applications in a smart device utilize the on-board sensors to sense changes in the device's peripherals and take necessary actions to improve the user experience of an ongoing task on the device. Unfortunately, while the applications with different sensors are increasing and the devices become smarter with more sensors on-board, the utilization of sensors has opened novel paths for attackers. Attackers can abuse sensors in many different ways. They can trigger an existing malware on the device with a simple flashlight. They can use light sensor to leak sensitive information. With motion sensors such as a gyroscope and an accelerometer, the attackers can record or steal sensitive information from other devices (e.g., computers, keyboards) or people nearby. They can even transfer specific malware using the sensors as a communication channel. These various sensor-based threats to security and privacy are poised to become more serious with the rapid growth of apps downloaded and installed in smart devices without checking whether it is from a trusted source.

These sensor-based threats expose the flaws of existing sensor management systems used by smart devices. Specifically, the Android sensor management system relies on permission-based access control, which considers only a few sensors (i.e., microphone, camera, and GPS). The Android O/S asks for access permission (i.e., with a list of permissions) only while the app is being installed for the first time. Once this permission is granted, the user has no control over how the listed sensors and other sensors will be used by that app. Moreover, using some sensors is not considered as a violation of security and privacy in Android. For instance, any app is permitted to access to motion sensors by just accessing the sensor manager API. Access to motion sensors is not controlled in Android.

Existing studies have proposed enhanced access control mechanisms for some of the sensors, but these enhancements do not cover all the sensors of a smart device. Some solutions introduce trusted paths on top of the existing security mechanism for controlling information flow between sensors and apps, but these are also app-specific solutions and depend upon explicit user consent. Thus, introducing more permission controls for sensors of a smart device will not mitigate the risk of all sensor-based attacks as they are app specific and address only data leakage risks. Some attacks may not abuse sensors directly, instead, they use sensors as side channels to activate another malware. Albeit useful, existing security schemes overlook these critical threats which directly impact the security and privacy of the smart device ecosystem. Moreover, sensors on smart devices work independently and it is necessary to secure all the different sensors.

Different works [73] have investigated the possibility of sensor-based attacks and presented different potential threats in recent years. One of the most common threats is keystroke inference in smart devices. Smart devices (e.g., smartphones, smartwatches, etc.) use on-screen QWERTY keyboard which has specific position for each button. When a user types in this keyboard, values in smartphone's motion sensor (i.e., accelerometer and gyroscope) change accordingly [16]. As different keystrokes give different, but specific values in motion sensors, typing information on smartphones can be inferred from an unauthorized sensor such as motion sensor data in the device or motion sensor data patterns collected can be used to extract users' input in smartphones [9, 66, 52].

The motion sensor data can be analyzed using different learning techniques (e.g., machine learning, frequency domain analysis, and shared-memory access) to improve the accuracy of inference techniques. Another form of keystroke inference attack can be performed by observing only gyroscope data. Smartphones have a feature of creating vibrations while user types on the touchpad. The gyroscope is sensitive to this vibrational force and it can be used to distinguish different inputs given by the users on the touchpad [51, 15, 44]. As light sensor readings also change while a user types on the smartphone, the user input in a smartphone can be inferred by differentiating the light sensor data in normal and typing modes. The light sensor can also be used as a medium to transfer malicious code and trigger message to activate malware [28, 76]. The audio sensor of a smartphone can be exploited to launch different malicious attacks (e.g., information leakage, eavesdropping) on the device.

Attackers can infer keystrokes by recording tap noises on touchpad [24], record conversation of users [63], transfer malicious code to the device [73, 76], or even replicate voice commands used in voice-enabled different apps like Sin and Google Voice Search [21, 39]. Modern smartphone cameras can be used to covertly capture screenshot or video and to infer information about surroundings or user activities. GPS of a smartphone can be exploited to perform a false data injection attack on smartphones and infer the location of a specific device.

Although researchers proposed different sensory-channel attack scenarios in recent years, no complete security mechanism has been proposed that can secure sensors of a smart device. Most of the proposed security mechanism for smart devices is related to anomaly detection at the application level which does not provide security against sensor-based attacks. On the other hand, different methods of intrusion detection have been proposed for wireless sensor networks (WSN), but they are not compatible with smart devices. Xu et al. proposed a privacy-aware sensor management framework for smartphones named Semadroid [76], an extension to the existing sensor management system where users could monitor sensor usage of different apps and invoke different policies to control sensor access by active apps on a smartphone. Petracca et al. introduced AuDroid, a SELinux-based policy framework for smart phones by performing behavior analysis of microphones and speakers [54]. AuDroid controls the flow of information in the audio channel and notifies users whenever an audio channel is requested for access. Jana et al. proposed DARKLY, a trust management framework for smartphones which audits applications of different trust levels with different sensor access permissions [28]. Darkly scans for vulnerability in the source code of an application and try to modify the run-time environment of the device to ensure privacy of sensor data.

The main limitation of Semadroid is that the authors only tested their solution against a similar type of attack scenario (information leakage by a background application). Authors also did not provide any extensive performance evaluation for Semadroid. Another limitation of this work is that, Semadroid depends on user permission to fully enforce an updated policy on the sensor usage which is vulnerable as users might unknowingly approve the sensor permissions for malicious apps. In another prior work Darkly, researchers did not test the framework against any sensor-based threats which exposes the limitation of this work. AuDroid represented a policy enforced framework to secure only the audio channels of a smart device. Authors did not consider other sensor-based threat which is the main shortcoming of this work.

There are no similar approaches to embodiments of the subject invention. Embodiments of the subject invention are unique in a sense that it can observe all the sensors on a device in real time and detect different sensor-based attacks (e.g., information leakage, eavesdropping, transferring trigger messages, etc.). Another big advantage of this invention is that, it uses simple machine learning algorithms (e.g., Markov Chain, Naïve Bayes techniques, Decision tree algorithm, Bayesian network, Support Vector Machines, etc.) which are easy to implement and provide better accuracy. Furthermore, embodiments of the subject invention are lightweight and work with very little system overhead. The method described in CN105956480A provides sensor data protection for devices. The main feature of this prior work is that it depends on users' decisions to set rules for trusted and untrusted apps. The main difference between subject invention and this prior work is that, embodiments of subject invention do not rely on user interaction to secure the sensors on smart device whereas above mentioned work depends on users' decisions to set rules for trusted and untrusted apps. US20060143439A1, U.S. Pat. Nos. 6,801, 878B1, and 7,378,962B2 describe different methods to manage sensors and associated data in system. No security measures are proposed in these patents. KR20060068518A proposes a context-aware system where sensors are used to identify user actions (e.g., location, task). Security of sensors is not described in this work. In embodiments of subject invention, a context-aware model is used to identify different sensor-based threats to a system which clearly vary from above mentioned work. US20130305357A1 refers to a context-aware network monitor to detect threats where activities in a system are used to identify threats in network traffic. This work does not comply with sensors, hence, security of the sensors on a device is not ensured using this method. U.S. Pat. No. 4,206,449A describes a multiple sensor intrusion alarm system, which identifies malfunction and tampering in a sensor. This invention is particularly used to identify hardware malfunction of sensors on a device. Compared to this work, embodiments of subject invention detect different sensor-based threats in the system rather than detecting hardware malfunction of the sensors.

Present versions of Android, IOS, or Blackberry do not comprise any security mechanism to manage the information flow from sensors or among them. Lack of knowledge about sensor-based threats paves the way for overlooking this design issue. For example, any app can get access to motion sensors by just accessing sensor manager API. This ignorance about securing the information flow between the sensors and apps can lead to different malicious scenarios, such as information leakage and eavesdropping.

FIG. 1 shows Android sensor management architecture. Referring to FIG. 1, the Android O/S handles different sensor access by apps (installed by the user) and system apps (installed automatically by the O/S). Applications can access to the sensors by sending requests via Software Development Kit (SDK) API platform which then registers the app to corresponding sensor. If more than one app tries to access the same sensor, SDK API runs a multiplexing process which enables different apps to be registered in the same sensor. Hardware Abstraction Layer (HAL) works as an interface to bind the sensor hardware with the device drivers in the Android O/S. HAL has two parts: Sensors.h working as HAL interface and Sensors.cpp working as HAL implementation. Through the HAL library, different applications can communicate with underlying Linux kernel to read and write files associated with sensors. For most of the sensors, no permission is needed to access these files. For permission-imposed sensors (i.e., camera, microphone, and GPS), a permission is needed from the user to ensure file access to a specific app. This user permission is declared inside the AndroidManifest.xml file of an app and once the user accepts the permission, that app can have access to the corresponding sensor and other no-permission imposed sensors even without any explicit approval from the users. This lack of security in sensor access can lead to different malicious attacks on a device.

The sensor-based threat scenarios related to malicious activities on a smart device are as follows:
Threat 1-Triggering a malicious app via a sensor: A malicious app can exist in the device which can be triggered by sending a specific sensory pattern or message via sensors.
Threat 2-Information leakage via sensor: A malicious app can exist in the device which can leak information to attackers using sensors.
Threat 3-Stealing information via sensor: A malicious app can exist in the device which can exploit the camera of a smartphone and start the camera after inferring the sleep mode in the smartphone.

In order to address these threats, embodiments of the subject invention present an intrusion detection system (IDS) framework using sensors onboard a smart device. The framework of an embodiment is a context-aware IDS and is built upon the observation that for any user activity or task (e.g., texting, making calls, browsing, and driving), a different, but a specific set of sensors becomes active and associated sensors' values and states change with a user's action. Embodiments observe these sensor data in real time and determine the states of the sensors on the device (e.g., smart phone, smart watch, smart lock, fitness bands, smart TV, home automation systems, and sensor based robots) to distinguish status of the sensors (i.e., malicious or benign). The method of an embodiment observes sensors' states and tries to match a device state with a training dataset using Markov Chain, Naive Bayes techniques, or other machine learning techniques such as Decision tree algorithm, Bayesian network, and Support Vector machines, as the analytical model for the intrusion detection. Instead of considering each sensor independently, which is the direction of the existing body of work, the framework of an embodiment uses all the sensors to build a context-aware model of an activity or task and considers all the sensors' states as one device state. In an embodiment, the framework has three main phases—(1) data collection, (2) data processing, and (3) data analysis. In data collection phase, specific Android application is used to collect sensor data from different sensors of a smart device (e.g., smartphone), with which both the value and the status information are collected from the sensors considering the different sampling rates and representation of sensor data.

In the framework, it is considered both the individual sensor readings values and the sampling rate of a sensor. The main reason for this is that sensors on a device have different sampling rates and representation of data. For example, motion sensors have higher frequency and provide numeric values for representing motion. On the other hand, microphone, speakers, and GPS provide outputs that can be represented as binary number where 1 represents that sensor is active and 0 represents that sensor is inactive. Data processing phase uses the collected data from the first phase and sample all the data according to sample frequency to build data matrices for analytical model (e.g., Markov chain, Naïve Bayes techniques, Decision tree algorithm, Bayesian network, and Support Vector Machines). In the data analysis phase, data matrices from the previous step are fed into the analytical model to determine whether the current device state is benign or malicious. The approach in an embodiment can detect different sensor-based attacks with accuracy and F-score as high as 98.33% and 98.99%, respectively. Hence, the technology of an embodiment presents a simple context-aware approach based on Markov Chain, Naïve Bayes techniques, Decision tree algorithm, Bayesian network, and Support Vector Machine for sensor-based attacks with higher accuracy.

The technology of an embodiment has future applications in the following uses:
Security: The technology can detect sensor-based attacks on devices which comprise following security aspects:
Malicious Sensor-based App detection: Sensor-based apps are common in the context of smart devices and as users usually don't verify whether an app is from a trusted source or not, attackers can easily change the source code and abuse the on-board sensors. The technology of an embodiment will monitor all the sensors in real-time and can identify any malicious activities going on a sensor node.

Secured information flow between sensors and devices: Information leakage is one of the most common attacks on smart devices (such as, smart phone, smart watch, smart lock, fitness bands, smart TV, home automation systems, and sensor based robots). The technology of an embodiment can detect unusual information flow from device to sensors or sensors to any outsider.

Device security posture: The technology can give overall security status of a device on the context of sensor-based attacks.

Identify malware triggering via sensors: Recently, different attack scenarios have been presented by researchers showing the possibility of triggering a malware planted on a device using sensor data. An embodiment can also detect this type of malicious attacks.

Efficient sensor management: An embodiment can work along with the existing sensor management system of different operating systems on smart devices (e.g., Android, Blackberry, iOS, Windows). In this way, the security of sensors on smart devices can be enhanced.

Users' privacy: Sensors of smart devices can be vulnerable to eavesdropping and stealing user information via sensors. The technology of an embodiment can detect these malicious activities with higher accuracy.

Sensors (e.g., light sensor, gyroscope, accelerometer) and sensing enabled applications on a smart device make the applications more user-friendly and efficient. However, the current permission-based sensor management systems of smart devices only focus on certain sensors and any app can get access to other sensors by just accessing the generic sensor-manager API. In this way, attackers can exploit these sensors in numerous ways: they can extract or leak users' sensitive information, transfer malware, or record or steal sensitive information from other nearby devices. In an embodiment, a context-aware intrusion detection system, which can be referred to as 6thSense, enhances security of smart devices by observing changes in sensor data for different tasks of its users and creating a contextual model to distinguish benign and malicious behavior on sensors. The context-aware intrusion detection system adapts three different detection mechanisms (Markov chain, Naive Bayes, and Machine Learning) to detect malicious behavior associated with sensors. The 6thSense of an embodiment can be implemented on an Android smartphone and can collect data from typical daily activities of 50 real users. Furthermore, the performance of 6thSense against three sensory channel attacks can be evaluated: (1) a malicious app that can be triggered via a sensor (e.g., light), (2) a malicious app that can leak information via a sensor, and (3) a malicious app that steals data using sensors. Our extensive evaluations show that the 6thSense framework is an effective and practical approach to defeat growing sensory-based attacks with accuracy above 96% without compromising the normal functionality of the device. Moreover, our framework costs minimal overhead.

An embodiment of the 6thSense (e.g., context-aware intrusion detector) defends against these threats and considers the following design assumptions and features:

Sensor co-dependence: A sensor in a smart device is normally considered as an independent entity on the device. Thus, one sensor does not know what is happening in another sensor. To address sensor dependency, 6thSense considers sensors as co-dependent entities on a device instead of independent entities. For each user activity or task on smart device, a specific set of sensors remain active. For example, if a user is walking with phone in hand, motion sensors, the light sensor, GPS will be active. On the contrary, if user is walking with phone in the pocket or bag, instead of the light sensor, proximity sensor will remain active. Thus, a co-dependent relationship is active between sensors while performing a specific task. Each activity uses a different, but specific set of sensors to perform the task efficiently. Hence, 6thSense can distinguish the user activity by observing the context of the sensors for a specific task. 6thSense uses the context of all the sensors to distinguish between normal user activities and malicious activities. That is, the sensors in a smart device are individually independent, but activity-wise dependent.

Adaptive sensor sampling: Different sensors have different sampling frequencies. To monitor all the sensor data for a specific time, a developed solution must consider and sample the sensor data correctly. If individual sensor frequency is considered for sampling each sensor data, there will be missing data for same time instance which will introduce error in detection technique. This design issue is considered while designing 6thSense. The framework of 6thSense considers sampling the sensor data over a certain time period instead of individual sensor frequencies which mitigates errors in processing of data from different sensors.

Faster computation: Modern high precision sensors on smart devices have high resolution and sampling rate. As a result, sensors provide large volume of data even for a small time interval. A solution for sensor-based threats should quickly process these large datasets from different sensors in real time while ensuring high detection rate. To address this issue, 6thSense uses different machine learning algorithms.

Real-time monitoring: 6thSense provides real time monitoring to all the sensors which mitigates the possibility of data tempering or false data injection on the device.

Thus, 6thSense is designed to cope with all the threats mentioned above.

Figure 2:
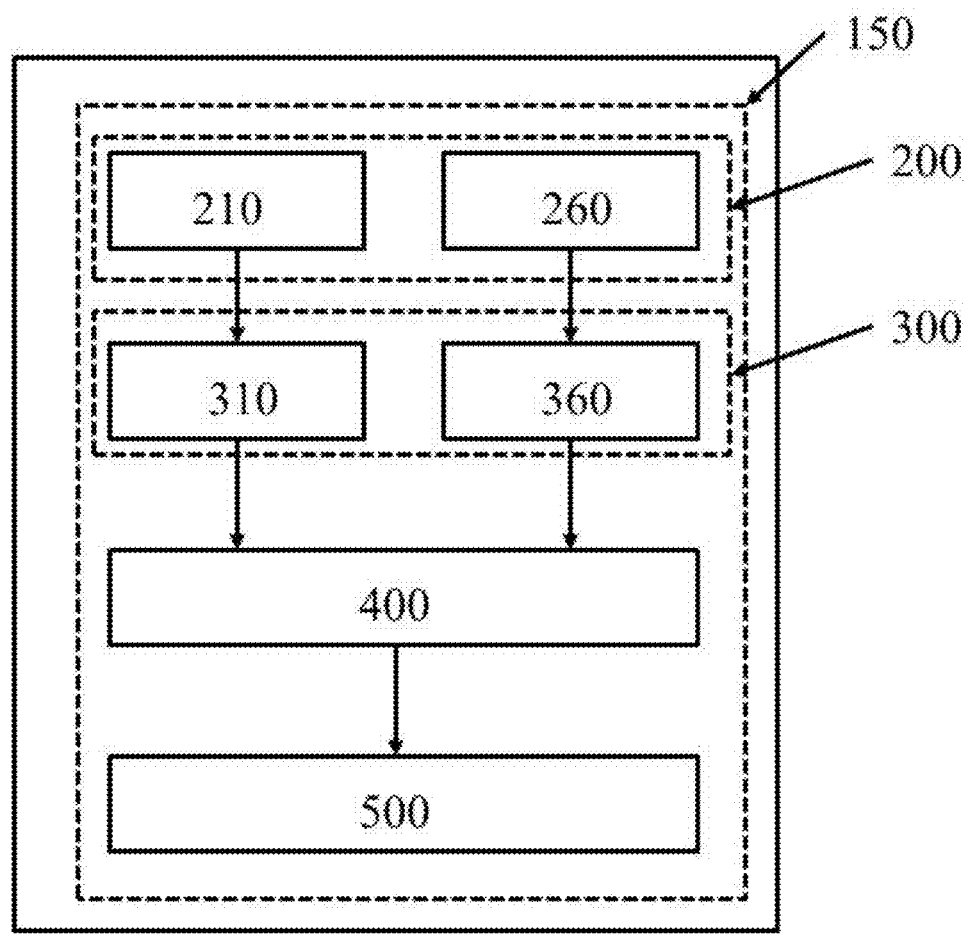
FIG. 2 shows a context-aware intrusion detector according to an embodiment of the subject invention.

FIG. 2 shows a context-aware intrusion detector according to an embodiment of the subject invention. A smart device 100 comprises a sensor 200 providing a numerical value and a state, a sensor data collector 300 receiving the numerical value and the state, a data processor 400 merging the numerical value and the state and creating an input matrix, and a data analyzer 500 determining a malicious behavior of the smart device 100 based on the input matrix.

The sensor 200 comprises a permission imposed sensor 210 generating the state and a no-permission imposed sensor 260 generating the numerical value. The permission imposed sensor 210 includes a camera, a microphone, a speaker, and a GPS. This permission imposed sensor 210 represents logic states (on/off state) for different user activities, thus is referred to as a logic oriented sensor. The no-permission imposed sensor 260 includes an accelerometer, a gyroscope, a light sensor, and a proximity sensor. This no-permission imposed sensor 260 does not need any user permission and generates numerical values inferring user activities, thus is referred to as a data oriented sensor.

The sensor data collector 300 comprises a sensor logic state detector 310 connected to the permission imposed sensor 210 and a sensor value collector 360 connected to the no-permission imposed sensor 260. The data processor 400 receives the numerical value through the sensor value collector 360 and the state through the sensor logic state detector 310 and then merges the numerical value and the state, thereby creating an input matrix. The data analyzer 500 receives the input matrix from the data processor 400 and determines a malicious behavior of the smart device 100 based on the input matrix.

The sensor 200 can be an on-board sensor which is integrated with a board 150 of the smart device 100. The sensor data collector 300, the data processor 400, and the data analyzer 500 can be implemented on the board 150 as an integrated chip (IC) type.

Figure 3:
FIG. 3 shows a process flow of a context-aware intrusion detector according to an embodiment of the subject invention.

FIG. 3 shows a process flow of a context-aware intrusion detector according to an embodiment of the subject invention. In particular, FIG. 3 provides a detailed overview of a contextual behavior IDS framework, 6thSense, for detecting sensor-based threats on smart devices. Referring to FIG. 3, 6thSense has three main phases: (1) data collection, (2) data processing, and (3) data analysis. In the data collection phase, a custom application is used to collect the sensor data for different user activities and the collected sensor data are then processed in the data processing phase. In phase 3, the data is feed into detection models and the end result indicates whether the current state of the device is malicious or not.

In the data collection phase, data from different sensors of a smart device are collected. There can be multiple sensors in a smart device, and nine sensors are considered in total to identify different user activities. These are, but are not limited to, accelerometer, gyroscope, light sensor, proximity sensor, GPS, audio sensor (microphone and speaker), camera, and headphone. The chosen sensors can be categorized into two following categories.

No-permission imposed sensors: No-permission imposed sensors can be defined as sensors that do not need any user permission for being accessed by an app. These sensors can also be referred as data oriented sensors because these sensor values are needed to be observed to infer user activities. For example, accelerometer's and gyroscope's value change with motion and they give values on X, Y, and Z axes. These values change along with the motion in different axes. To detect whether the sensors are activated or not for a specific activity, values of these sensors are observed.

Permission imposed sensors: Permission imposed sensors are those which need user permission to be accessed by an app. These sensors conditions can be represented by logic state (on/off state) for different user activities. Hence, these sensors are referred as logic oriented sensors. For example, a camera has only two values to identify users' activity: on and off. So, it can be represented as 0 or 1 to detect that the camera is on or off correspondingly.

Accelerometer, gyroscope, light sensor, and proximity sensor are categorized as data oriented sensor while all other sensors are categorized as logic oriented sensor. To collect the values, two apps including a sensor value collector and a sensor logic state detector are built. The sensor value collector collects numerical values of the data oriented sensors. In Android, this app uses sensoreventlistener API to log numerical values of the sensors. On the other hand, the sensor logic state detector determines the state of the sensor and logs 0 or 1 if the sensor is on or off, respectively. This app uses the user permission access to use the microphone, GPS, and camera to record the working condition of these sensors.

The different human activities that involve the smart device are chosen to build contextual model. These activities include walking (with phone in hand and pocket), talking, interacting (playing games, browsing, and listening to music), video calling, and driving (as driver and passenger). The number of human activities is configurable in 6thSense and is not limited to aforementioned examples. These nine activities are chosen as they are considered as common user activities for a smart device. These data using the apps for different users are collected to train the framework which is then used to distinguish the normal sensor behavior from the malicious behavior.

After the data collection, in the second phase of the framework, the data is organized to use in the IDS framework. As different sensors have different frequencies on a smart device and the total number of readings of sensors for a specific time period is different, it is necessary to sample data to use them for analysis part. For example, the accelerometer and gyroscope of Samsung Galaxy S5™ have a sampling frequency of approximately 202 Hz while the light sensor has a sampling frequency of 5.62 Hz. Thus, the data collected in the data collection phase needs to be sampled and reorganized. It is observed the change in the sensor condition in each second to determine the overall state of our device and from this per second change, and 6thSense determines the activity of users. For this reason, 6thSense takes all the data given by a single sensor in a second and calculates the average value of the sensor reading. This process is only applicable for the data oriented sensors mentioned earlier. Again, the data collected from the sensor value collector is numerical value given by a sensor. However, for our analytical model, the condition of the sensors is considered. The data collected by aforementioned app is observed and it is determined whether the condition of sensors is changing or not. If the sensor value is changing from the previous timestamp, 6thSense represents the sensor condition as 1 and 0 otherwise. The data collected from the sensor logic state detector needs to be reorganized too as these data are merged with the data collected from the sensor value collector to create the input matrix. The sampling frequency of the sensor logic state detector app is 0.2 Hz which means in every five seconds this app generates one session of dataset. The condition of the sensors to be same over this time period is considered and the data is organized accordingly. These reorganized data generated from aforementioned apps are then merged to create the training matrices.

In the third and final phase of 6thSense, three different detection techniques can be used to analyze data matrices generated in the previous phase. For the context-aware IDS in 6thSense, different machine learning approaches (Markov Chain, Naïve Bayes model, LMT, J48, etc.) are used to differentiate normal behavior from malicious behavior on a smart device. The main advantage of using Markov Chain model is that it is easy to build the model from large dataset and computational requirements are modest which can be met by resource-limited devices. As smart devices have less processing speed, Markov Chain based approach can work smoothly in the context of sensor data analysis. On the other hand, Naive Bayes technique is chosen for its fast computation rate, small training dataset requirement, and ability to modify with new training data without rebuilding the model from the beginning. Machine learning techniques are also common in malware detection because of higher accuracy rate.

A Markov Chain model can be described as a discrete-time stochastic process which denotes a set of random variables and defines how these variables change over time. Markov Chain can be applied to illustrate a series of events where what state will occur next depends only on the previous state. In an embodiment, a series of events represents user activity and state represents condition (i.e., values, on/off status) of the sensors in a smart device. The probabilistic condition of Markov Chain can be represented in Equation 1 where Xt denotes the state at time t.

$$P(X_{t+1}=x|X_1=x_1, X_2=x_2, \ldots, X_t=x_t) = P(X_{t+1}=x|X_t=X_t), \quad (1)$$

when, $P(X_t=x_1, X_2=x_2, \ldots, X_t=x_t) > 0$

In an embodiment, the changes of condition of a set of sensors are observed as a variable which changes over time. The condition of a sensor indicates whether the sensor value is changing or not from a previous value in time. It is assumed that, S denotes a set which represents current conditions of n number of sensors. So, S can be represented as follows.

$$S = \{S_1, S_2, S_3, \ldots, S_n\},$$

$$S_1, S_2, S_3, \ldots, S_n = 0 \text{ or } 1 \quad (2)$$

For 6thSense, a modified version of the general Markov Chain model can be used. Here, instead of predicting the next state, it is determined the probability of occurring a transition between two states at a given time. In an embodiment, Markov Chain model is trained with a training dataset collected from real users and builds the transition matrix accordingly. Then, it is determined sensor working condition for time t and t+1. When it is assumed that a and b are sensor's state in time t and t+1, the probability of transition from state a to b can be found by looking up in the transition matrix, P and calculating P(a,b). As the training dataset consists of sensor data from benign activities, it can be assumed that, if transition from state a to b is malicious, the calculated probability from transition matrix will be zero.

A Naive Bayes model is a simple probability estimation method which is based on Bayes' method. The main assumption of the Naive Bayes detection is that the presence of a particular feature in an event has no influence over the presence of any other feature on that particular event. Probability of each event can be calculated by observing presence of a set of specific features. In 6thSense, it is considered users' activity as a combination of n number of sensors. It is assumed that X is a set which represents current conditions of n number of sensors. It is considered that conditions of sensors are conditionally independent, which means a change in one sensor's working condition has no effect over a change in another sensor's working condition. As it is explained earlier, the probability of executing a task depends on the conditions of a specific set of sensors. So, in summary, although one sensor's condition does not control another sensor's condition, overall probability depends on all the sensors' conditions. For example, if a person is walking with his smartphone in his hand, the motion sensors (accelerometer and gyroscope) will change. However, this change will not force the light sensor or the proximity sensor to change its condition. Thus, sensors in a smartphone change their conditions independently, but execute a task together. From Equation 3, a generalized formula for this context-aware model is made:

$$p(X|c) = \prod_{i=1}^{n} p(X_i|c) \quad (3)$$

Machine learning (ML) algorithms have become very popular for anomaly detection frameworks because of their faster computation ability and easy implementation feature. In the ML-based approach, four types of classifier can be used to build analytical model for 6thSense.

First, rule-based ML works by identifying a set of relational rules between attributes of a given dataset and represent the model observed by the system. Main advantage of Rule-based learning is that it identifies a single model which can be applied commonly to any instances of the dataset to make a prediction of outcome. As an embodiment trains 6thSense with different user activities, rule-based learning provides one model to predict data for all the user activities which simplify the framework. For the model in an embodiment, it can be chosen PART algorithm for Rule Based Learning.

Second, a regression model can be used in data mining for its faster computation ability. This type of classifier observes the relations between dependent and independent variables to build a prediction model. For 6thSense, total 11 attributes are considered including one dependent variable (working condition of the device) and ten independent variables (sensor conditions). Regression model observes the change in the dependent variable by changing the values of the independent variables and builds the prediction model. The logistic regression model can be used in 6thSense.

Third, a neural network is another technique that can be adapted for malware detection. In neural network techniques, the relation between attributes of dataset is compared with the biological neurons and a relation map is created to observe the changes for each attribute. Multilayer Perceptron algorithm can be used for training the framework of 6thSense as it can distinguish relationships between nonlinear dataset.

Fourth, decision tree algorithms are predictive models where decision maps are created by observing the changes in one attribute in different instances. These types of algorithms are mostly used in a prediction model where output can have a finite set of values. For 6thSense, three different decision tree algorithms including J48, LMT (Logistic Model Tree), and Hoeffding tree can be considered to compare the outcome of the framework.

For the Markov Chain based detection, an embodiment uses 75% of the collected data to train 6thSense and generates the transition matrix. This transition matrix is used to determine whether the transition from one state to another state is appropriate or not. Here, state refers to generic representation of all the sensors' conditions on a device. For testing purposes, an embodiment has two different data set basic activities or trusted model and malicious activities or threat model. The trusted model consists of 25% of the collected data for different user activities.

To implement the Naive Bayes based detection technique, an embodiment uses the training sessions to define different user activities. The nine user activities are listed in Table 1.

TABLE 1

Typical Activities of Users on Smart Device

| Task Category | Task Name |
|---|---|
| Generic Activities | 1. Sleeping |
| | 2. Driving as driver |
| | 3. Driving as passenger |
| User-related Activities | 1. Walking with phone in hand |
| | 2. Walking with phone in pocket/bag |
| | 3. Playing games |
| | 4. Browsing |
| | 5. Making phone calls |
| | 6. Making video calls |

In an embodiment, ground truth user data can be used to define these activities. Using the theoretical foundation explained above, an embodiment calculates the probability of a test session to belong to any of these defined activities. As it is considered one second of data in each computational cycle, an embodiment calculates the total probability up to a predefined time (in this case five minutes). This calculated probability is used to detect malicious activities from normal activities. If the computed probability for all the known benign activities is not over a predefined threshold then it is detected as a malicious activity.

For the ML-based detection technique, an embodiment uses WEKA, a data mining tool which offers data analysis using different machine learning approaches. Basically, WEKA is a collection of machine learning algorithms developed at the University of Waikato, New Zealand, which can be directly applied to a dataset or can be integrated with a framework using JAVA platform. WEKA offers different types of classifier to analyze and build predictive model from given dataset.

Sensor management systems in smart devices and mobile operating systems (e.g., Android, iOS, Blackberry, Windows) are based upon explicit permission access, which is, however, only enforced for some of the sensors (e.g., microphone, camera, GPS) on the smart device. Different studies have proposed enhanced access control for some sensors, but these enhancements do not cover all the sensors of smart devices (e.g., smart phone, smart watch, smart lock, fitness bands, smart TV, home automation systems, and sensor based robots).

Embodiments of the subject invention are different from previous works at least because an intrusion detection system can be used as an additional security layer, which can work alongside the existing sensor management systems to enhance the security of the smart devices (e.g., smart phone, smart watch, smart lock, fitness bands, smart TV, home automation systems, and sensor based robots). Embodiments allow the device itself to detect malicious activities occurring in any sensor. Again, present sensor management systems and the existing enhancements of this only rely on user permission which is vulnerable as user can unknowingly allow a malicious app to use different sensors of a device. On the other hand, embodiments can perform sensor-based attack detection independently without relying on any user consent. Furthermore, embodiments can detect different sensor-based attacks to a device, such as information leakage, eavesdropping, and sending a trigger message, where other solutions can detect only one type of attack (information leakage). The framework of an embodiment provides high efficiency regarding sensor-based attack detection without compromising normal device state.

The technique of embodiments of the subject invention is unique in a sense that it can observe all the sensors on a device in real time and detect different sensor-based attacks (e.g., information leakage, eavesdropping, and transferring trigger messages). Another big advantage of this technique is that, it uses simple machine learning algorithms (e.g., Markov Chain, Naïve Bayes techniques, Decision tree algorithm, Bayesian network, and Support Vector Machines), which are easy to implement and provide better accuracy. Furthermore, the technology is lightweight and works with very little system overhead.

This technology will improve security of smart devices with sensors against malicious attacks. Furthermore, it can be adapted in Internet of Things (IoT) domain and improve security of any IoT devices with sensors. This may help to provide privacy of users and secure information flow from sensors to application layer.

The main commercial application of this technology is in the security of smart devices such as smart phone, smart watch, smart lock, fitness bands, smart TV, home automation systems, and sensor based robots. Any smart device with sensors will need a technology like ours to increase its security awareness. The technology can be implemented along with existing permission-based sensor management system of smart device operating systems (e.g., Android, iOS, Blackberry, Windows) and can enhance security against side-channel attacks, such as information leakage, eavesdropping, transferring malwares, and sending trigger messages.

Another application domain can be the security and privacy of IoT devices. Modern IoT devices come with different sensors and they are vulnerable to sensor-based attack, too. The technology of embodiments can be adapted in IoT platforms and provide security and privacy against these attacks.

Embodiments of the subject invention ensure secure information flow between different devices. Nowadays, smart devices (e.g., smart phone, smart watch, smart lock, fitness bands, smart TV, home automation systems, and sensor based robots) are connected with each other and share information. This information can be leaked via sensors that could lead to different criminal activities, such as credit card fraud, stealing of social security, and hacking bank accounts. The framework of embodiments can detect malicious information sharing which can help to prevent these threats.

Also, the technology enhances usability of smart devices. Present sensor management systems do not allow users to learn about how different apps are accessing different sensors. By contrast, the framework of embodiments allows user to learn how sensors' status change with different activities/tasks.

The intrusion detection technology via sensors of embodiments of the subject invention is simple and works against different sensor-based attacks with high accuracy. The overhead of the technology is minimal and it is a simple approach, which can be implemented easily on modern mobile, smart device, or IoT device operating systems. As more sensors are being integrated in smart devices (e.g., smart phone, smart watch, smart lock, fitness bands, smart TV, home automation systems, and sensor based robots), possibility of sensor-based attack is also increasing. With increasing investment in device industries and growing security concerns of smart devices (e.g., smart phone, smart watch, smart lock, fitness bands, smart TV, home automation systems, and sensor based robots), Internet of Things devices, and Industrial IoT devices, it is plain that the technology is important.

Compared to the existing solutions, 6thSense differentiates itself by considering a context-aware model to detect sensor-based threats. As sensors provide continuous data to the apps, security schemes must handle real-time data rather than stored data in the system. While most of the existing solutions work with stored data and data usage by apps, 6thSense offers real-time sensor monitoring. On the other hand, modern high precision sensors on-board have higher frequency and sensitivity. These sensors can detect slight changes in the smart device's ambiance which reflects on sensor values. To overcome frequent change in sensor values, 6thSense considers average value over one second, which mitigates the effect of changes in sensor values caused by device ambiance. For example, if a person walks by a smartphone, the light sensor and motion sensors value will be changed for that instance. But if we consider the average value over one second, it will be compensated by other readings recorded over one second.

Another unique feature of 6thSense is that instead of considering the sensor data accessed by the apps, user activities are monitored, which provides the contextual model for our framework. 6thSense observes changes in sensors for different user activities. As more than one sensor remain active to perform a task, attackers have to learn the pattern of all the sensors for user activities to outperform 6thSense. If an attacker targets one specific sensor, an attack scenario will differ from normal user activity which can be detected by 6thSense. Thus, the context of user activities is very important to detect malicious activities in 6thSense.

Moreover, 6thSense considers all the sensors' condition as one device state, which provides easy monitoring of the sensors by one framework. Finally, 6thSense can work with all the sensors on a smart device extending the security beyond the traditional permission-imposed sensors (i.e., GPS, microphone, and camera).

The subject invention includes, but is not limited to, the following exemplified embodiments.

Embodiment 1

A context-aware intrusion detector, comprising:
a sensor including a no-permission imposed sensor and a permission imposed sensor;
a sensor data collector receiving a numerical value from the no-permission imposed sensor and receiving a state from the permission imposed sensor;
a data processor merging the numerical value and the state, and creating an input matrix; and
a data analyzer differentiating a malicious behavior from a normal behavior based on the input matrix.

Embodiment 2

The context-aware intrusion detector according to embodiment 1, the no-permission imposed sensor being a data oriented sensor including at least one of an accelerometer, a gyroscope, a light sensor, and a proximity sensor.

Embodiment 3

The context-aware intrusion detector according to any of embodiments 1 and 2, the permission imposed sensor being a logic oriented sensor including at least one of a camera, a microphone, a speaker, a headphone, and a GPS.

Embodiment 4

The context-aware intrusion detector according to any of embodiments 1-3, the sensor data collector comprising a sensor value collector connected to the no-permission imposed sensor and a sensor logic state detector connected to the permission imposed sensor.

Embodiment 5

The context-aware intrusion detector according to embodiment 4, the sensor logic state detector determining the state of the permission imposed sensor and providing 0 or 1 according to on-state or off-state.

Embodiment 6

The context-aware intrusion detector according to any of embodiments 1-5, the data processor taking the numerical value from the no-permission imposed sensor in a predetermined time and calculating an average value.

Embodiment 7

The context-aware intrusion detector according to any of embodiments 1-6, the data processor sampling the state provided by the sensor logic state detector at a predetermined frequency.

Embodiment 8

The context-aware intrusion detector according to embodiment 7, the predetermined time being a second and the predetermined frequency being 0.2 Hz.

Embodiment 9

The context-aware intrusion detector according to any of embodiments 1-8, the data processor creating the input matrix by using the average value and the sampled state.

Embodiment 10

The context-aware intrusion detector according to any of embodiments 1-9, the data analyzer generating a transition matrix from the input matrix.

Embodiment 11

The context-aware intrusion detector according to any of embodiments 1-10, the data analyzer checking calculated probability of an activity of a user from the input matrix against a threshold.

Embodiment 12

The context-aware intrusion detector according to any of embodiments 1-11, the data analyzer providing a model to predict data for an activity of a user.

Embodiment 13

A context-aware intrusion detection method, comprising:
providing a numerical value from a no-permission imposed sensor;
providing a state from a permission imposed sensor;
receiving the numerical value and the state by a sensor data collector;
merging the numerical value and the state by a data processor;
creating an input matrix by the data processor; and
determining a malicious behavior based on the input matrix by a data analyzer.

Embodiment 14

The method according to embodiment 13, the no-permission imposed sensor comprising at least one of an accelerometer, a gyroscope, a light sensor, and a proximity sensor.

Embodiment 15

The method according to any of embodiments 13 and 14, the permission imposed sensor comprising at least one of a camera, a microphone, a speaker, a headphone, and a GPS.

Embodiment 16

The method according to any of embodiments 13-15, the receiving the numerical value being performed by a sensor value collector connected to the no-permission imposed sensor and the receiving the state being performed by a sensor logic state detector connected to the permission imposed sensor.

Embodiment 17

The method according to any of embodiments 13-16, the merging the numerical value and the state including taking the numerical value from the no-permission imposed sensor in a predetermined time and calculating an average value.

Embodiment 18

The method according to any of embodiments 13-17, the merging the numerical value and the state including sampling the state provided by the sensor logic state detector at a predetermined frequency.

Embodiment 19

The method according to any of embodiments 13-18, the determining a malicious behavior including training an analytical model and checking a data to indicate whether a state of a device is malicious or not.

Embodiment 20

A smart device comprising, comprising:
a data oriented sensor providing a numerical value;
a logic oriented sensor providing a state;
a sensor value collector connected to the data oriented sensor;
a sensor logic state detector connected to the logic oriented sensor;
a data processor connected to the sensor value collector and the sensor logic state detector; and
a data analyzer connected to the data processor,
the data processor taking the numerical value receiving from the sensor value collector, calculating an average value from the numerical value, sampling the state receiving from the sensor logic state detector, and creating an input matrix by using the average value and the sampled state, and
the data analyzer receiving the input matrix, training an analytical model, and checking a data to indicate whether a state of the smart device is malicious or not.

A greater understanding of the present invention and of its many advantages may be had from the following example, given by way of illustration. The following example is illustrative of some of the methods, applications, embodiments, and variants of the present invention. It is, of course, not to be considered as limiting the invention. Numerous changes and modifications can be made with respect to the invention.

Example 1

The efficiency of our proposed context-aware IDS framework, 6thSense, is evaluated in detecting the sensor-based threats on a smart device. An embodiment tests 6thSense with the data collected from different users for benign activities and from attack scenarios. The three threat models are created: (1) a malicious app that can be triggered via a light and motion sensors, (2) a malicious app that can leak information via audio sensor, and (3) a malicious app that steals data via camera sensor. Furthermore, the performance impact of 6thSense is measured on the device with different variables and a detailed overview of efficiency of an embodiment is presented. In order to test the effectiveness of 6thSense, Android-based smartphone is used. Samsung Galaxy S5 Duos™ is used as a reference Android device to collect sensor data for different user activities. A list of sensors of Samsung Galaxy S5 Duos is given in Table 2.

TABLE 2

Sensor list of Samsung Galaxy S5 Duo used in experiment.

| Sensor type | Name | Model | Specification |
| --- | --- | --- | --- |
| No-permission imposed sensors | Accelerometer | MPU6500 Acceleration Sensor | 19.6133 m/s$^2$, 203.60 Hz, 0.25 mA |
| | Gyroscope | MPU6500 Gyroscope Sensor | 8.726646 rad/s, 203.60 Hz, 6.1 mA |
| | Light Sensor | TMG399X RGB Sensor | 600000 lux, 5.62 Hz, 0.75 mA |
| | Proximity Sensor | TMG399X proximity sensor | 8 V, 0.75 mA |
| Permission-imposed sensors | Camera | Samsung S5K2P2XX | 12 megapixels, 30 fps, 4.7 mA |
| | Microphone | Qualcomm Snapdragon 801 Processor built in microphone | 86 dB, .75 mA |
| | Speaker | Qualcomm Snapdragon 801 Processor built in speaker | 110 dB, 1 mA |

Nine different user activities or tasks were selected to collect user data. These are basic activities with smartphones that people usually do in their daily life. The user activities or tasks are categorized in two categories as generic activities and user related activities.

Generic activities are the activities in which the sensor readings are not affected by the smartphone users. Sleeping, driving with the phone using GPS as a navigator, and driving with phone in pocket are three generic activities. Basically, in the generic activities, sensors data is not affected by different users since smart phone is not in contact with the user or user is not directly interacting with the phone. For user related activities, in which the sensor readings might be affected by the device user, there are six different activities, including walking with phones in hand, playing games, browsing, and making voice calls and video calls. 6thSense is tested by 50 different individuals aged from 18 to 45 while the sensor data is collected. An embodiment collects 300 sets of data for six user related activities where each dataset comprises 5 minutes long data from the selected nine sensors. The three sets of data for each general activity are collected.

The different users are asked to perform same activity to ensure the integrity for different tasks. For the malicious dataset, the three attack scenarios mentioned above are created. For Threat 1, it is developed two different Android apps which can be triggered using the light sensor and motion sensors on the smartphone. To perform the attack described in Threat 2, it is developed a malware that could record conversations as audio clips and playback after a specific time to leak the information. This attack scenario includes both the microphone and speaker on the smartphone. For Threat 3, it is developed a malicious app that could scan all the sensors and if none of the sensors were changing their working conditions, the malicious app could open up the camera and record videos surreptitiously. 15 different datasets are collected from these three attack scenarios to test efficacy of 6thSense.

In order to test 6thSense, the collected data is divided into two sections. 75% of collected benign dataset is used to train the framework and 25% of the collected data along with malicious dataset is used for testing purposes. For Markov Chain-based detection technique, training dataset is used to compute the state transitions and to build the transition matrix. On the other hand, in Naïve Bayes-based detection technique, training dataset is used to determine frequency of sensor condition changes for a particular activity task. There are nine activities for the Naive Bayes technique. The data according to their activity is split for this approach. For WEKA analysis, it is defined all the data in benign and malicious class. The data are then used to train and test 6thSense using 10-fold cross validation for different ML algorithms. In the evaluation of 6thSense, the following six different performance metrics are used: recall rate (sensitivity or True Positive rate), False Negative rate, specificity (True Negative rate), False Positive rate, accuracy, and F-score. True Positive (TP) indicates number of benign activities that are detected correctly while true negative (TN) refers to the number of correctly detected malicious activities. On the other hand, False Positive (FP) states malicious activities that are detected as benign activities and False Negative (FN) defines number of benign activities that are categorized as malicious activity. F-score is the performance metrics of a framework that reflects the accuracy of the framework by considering the recall rate and specificity. The performance metrics are given below:

$$\text{Recall rate} = \frac{TP}{TP + FN},$$

$$\text{False negative rate} = \frac{FN}{TP + FN},$$

-continued $$\text{Specificity} = \frac{TN}{TN + FP},$$

$$\text{False positive rate} = \frac{FP}{TN + FP},$$

$$\text{Recall rate} = \frac{TP}{TP + FN},$$

$$\text{Accuracy} = \frac{TP + TN}{TP + TN + FP + FN},$$

$$F\text{-score} = \frac{2 * \text{Recall rate} * \text{Precision rate}}{\text{Recall rate} + \text{Precision rate}}$$

In the Markov Chain-based detection technique, it is questioned whether the transition between two states is expected or not. 65 testing sessions are used in total, among which 50 sessions are for benign activities and the rest of the sessions are for malicious activities. A session is composed of a series of sensory context conditions where a sensory context condition is the set of all available sensor conditions for different sensors. A sensor condition is a value indicating whether the sensor data is changing or not. In this evaluation, sensory context conditions are computed every one second. It is observed that in real devices sometimes some sensor readings are missed or real data are not reflected probably due to hardware or software imperfections. Such instantaneous faulty sensor readings would cause malicious states in the system for limited time instances. On the other hand, real malicious apps would cause consecutive malicious states on the device. Therefore, to overcome this, track of number of consecutive malicious states is kept and a threshold is used after which the session is considered as malicious. Table 3 displays the evaluation results.

When the threshold for consecutive malicious states is 0, i.e., when no threshold applied, the accuracy is just 68% and False Negative rate is as high as 38%. For increasing the threshold value, the accuracy first increases up to 98% then start decreasing. The possible cut-off threshold can be three consecutive malicious occurrences which has both accuracy and F-score over 98%. In Table 3, different performance indicators for Markov Chain based detection are represented. In Table 3, it can be observed that false negative and true negative rate of Markov Chain-based detection decreases with the increment in the threshold number of consecutive malicious state. Again, both accuracy and F-score reach to a peak value with the threshold of three consecutive malicious states on the device.

TABLE 3

Performance evaluation of Markov Chain based model.

| Threshold (Number of consecutive malicious states) | Recall rate | False negative rate | Precision rate (specificity) | False positive rate | Accuracy | F-score |
|---|---|---|---|---|---|---|
| 0 | 0.62 | 0.38 | 1 | 0 | 0.6833 | 0.7654 |
| 1 | 0.86 | 0.14 | 1 | 0 | 0.8833 | 0.9247 |
| 2 | 0.96 | 0.04 | 1 | 0 | 0.9667 | 0.9796 |
| 3 | 0.98 | 0.02 | 1 | 0 | 0.9833 | 0.9899 |
| 5 | 1 | 0 | 0.9 | 0.1 | 0.9833 | 0.9474 |
| 6 | 1 | 0 | 0.8 | 0.2 | 0.9667 | 0.8889 |
| 8 | 1 | 0 | 0.6 | 0.4 | 0.9333 | 0.75 |
| 10 | 1 | 0 | 0.5 | 0.5 | 0.9167 | 0.6667 |
| 12 | 1 | 0 | 0.5 | 0.5 | 0.9167 | 0.6667 |
| 15 | 1 | 0 | 0.3 | 0.7 | 0.8833 | 0.4615 |

Figure 4:
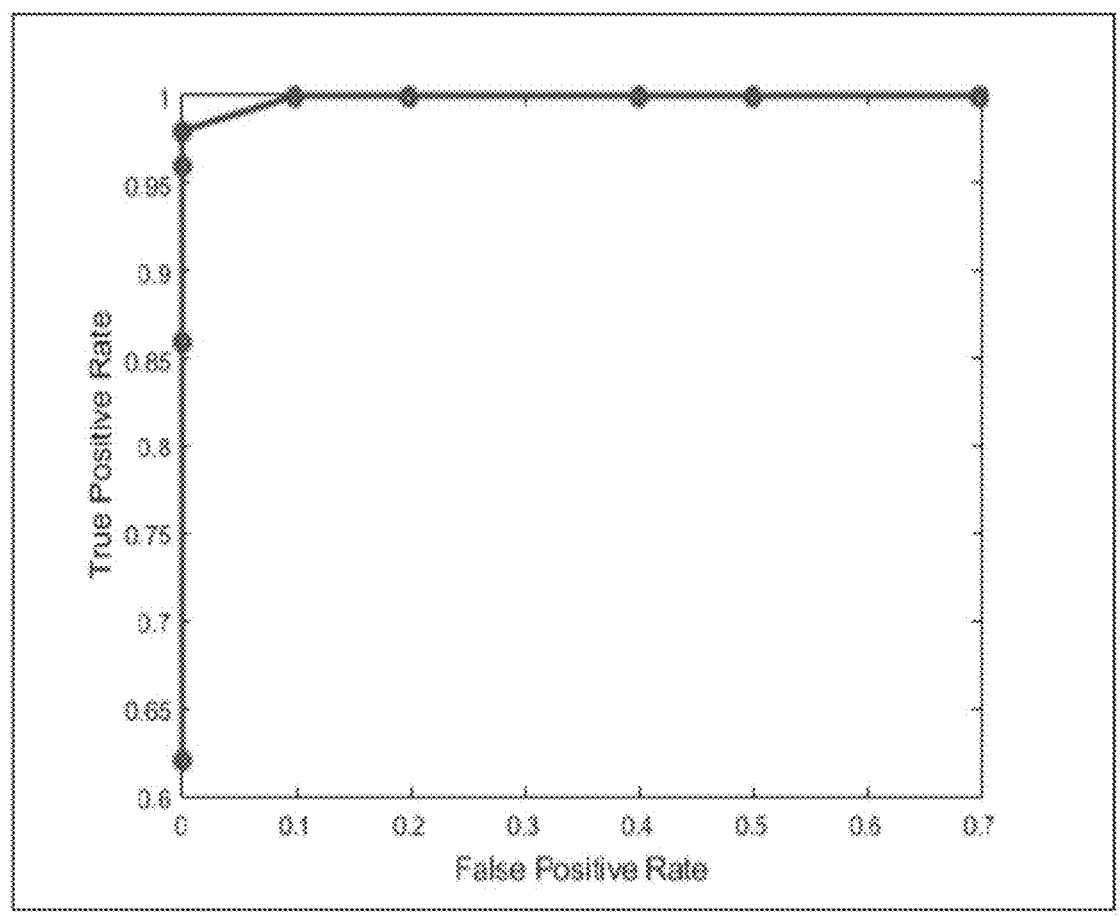
FIG. 4 shows a receiver operating characteristic curve of Markov Chain-based detection.

FIG. 4 shows a receiver operating characteristic (ROC) curve of Markov Chain-based detection. Referring to FIG. 4, it can be seen that, False Positive rate remains zero while True Positive rate increases at the beginning. Highest True Positive rate without introducing any False Positive case is over 98%. After 98%, it introduces some False Positive cases in the system which is considered as a risk to the system. In summary, Markov Chain model can acquire accuracy over 98% without introducing any False Positive cases in the system.

In Naive Bayes-based detection technique, 6thSense calculates the probability of a session to match with each activity defined above. Since all activities are benign and there is no malicious activity ground-truth data, 6thSense checks calculated probability of an activity from dataset against a threshold to determine the correct activity. If there is no match for a certain sensor condition with any of the activities, 6thSense detects the session as malicious. Table 4 shows the evaluation results.

TABLE 4

Performance evaluation of Naive Bayes model.

| Threshold Probability | Recall rate | False negative rate | Precision rate (specificity) | False positive rate | Accuracy | F-score |
|---|---|---|---|---|---|---|
| 55% | 1 | 0 | 0.6 | 0.4 | 0.9333 | 0.75 |
| 57% | 1 | 0 | 0.7 | 0.3 | 0.95 | 0.8235 |
| 60% | 1 | 0 | 0.7 | 0.3 | 0.95 | 0.8235 |
| 62% | 1 | 0 | 0.7 | 0.3 | 0.95 | 0.8235 |
| 65% | 0.94 | 0.06 | 0.7 | 0.3 | 0.9 | 0.8024 |
| 67% | 0.88 | 0.12 | 0.7 | 0.3 | 0.85 | 0.7797 |
| 70% | 0.7 | 0.3 | 0.8 | 0.2 | 0.7167 | 0.7467 |
| 72% | 0.7 | 0.3 | 0.9 | 0.1 | 0.7333 | 0.7875 |
| 75% | 0.66 | 0.34 | 0.9 | 0.1 | 0.7 | 0.7616 |
| 80% | 0.66 | 0.34 | 0.9 | 0.1 | 0.7 | 0.7615 |

When a threshold value equals to 55%, False Negative rate is zero. However, False Positive rate is too high, which lowers F-score of the framework. For a threshold of 60%, False Positive rate decreases while False Negative rate is still zero. In this case, accuracy is 95% and F-score is 82%. If the threshold over 65% is increased, it reduces the recall rate which affects accuracy and F-score. Evaluation indicates that the threshold value 60% provides an accuracy of 95% and F-score of 82%.

Figure 5:
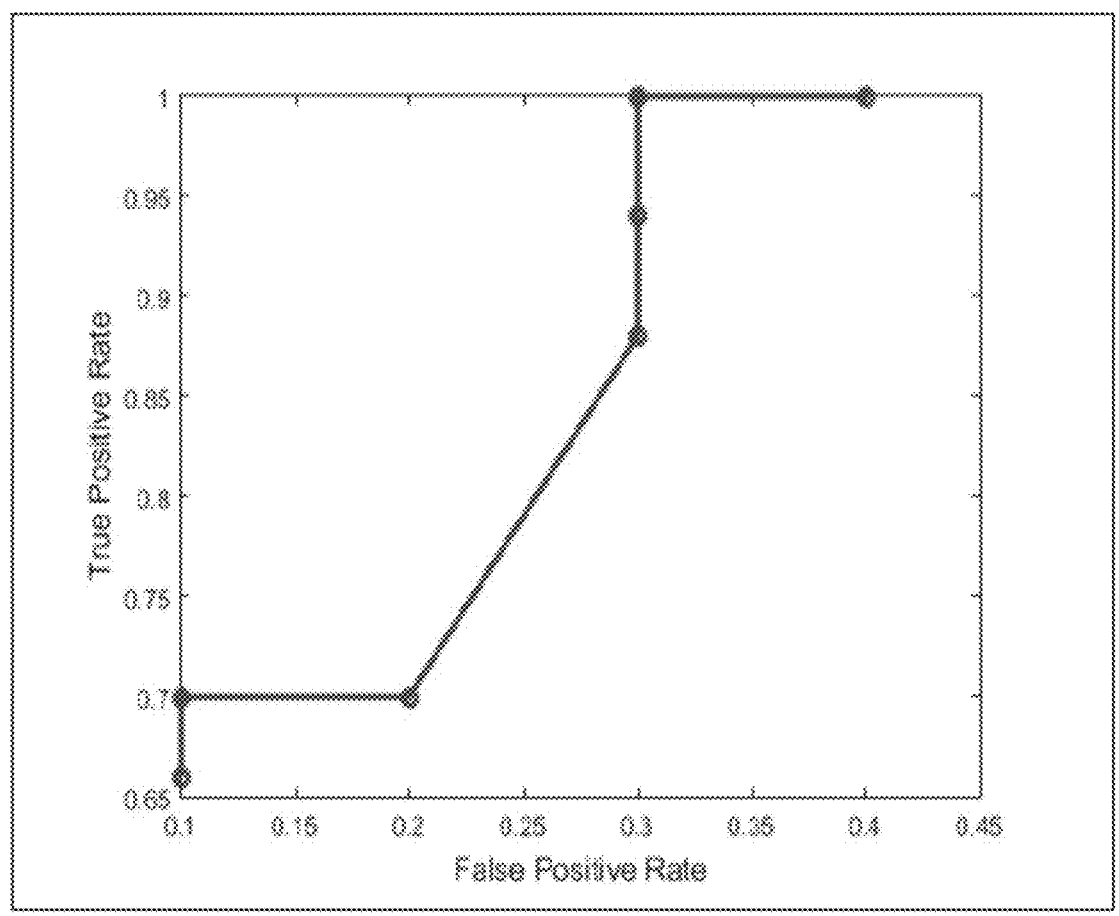
FIG. 5 shows a receiver operating characteristic curve of Naïve Bayers-based detection.

FIG. 5 shows a receiver operating characteristic (ROC) curve of Naïve Bayers-based detection. Referring to FIG. 5, it is observed the relation between False Positive rate and True Positive rate of Naive Bayes-based detection. For false positive rate larger than 0.3, true positive rate become 1.

In machine learning-based detection, an embodiment uses supervised learning techniques to train our framework. WEKA provides three types of analysis—split percentage analysis, cross-validation analysis, and provided test data. An embodiment chooses 10 fold cross-validation analysis to ensure all the data is used for both training and test. Thus the error rate of the predictive model will be minimized in the cross validation. In Table 5, a detailed evaluation of different machine learning algorithms is given for 6thSense.

For Rule Based Learning, the best result for PART algorithm is made, which has an accuracy of 0.99 and F-score of 0.7899. On the other hand, for Regression Analysis, it is used the logistic function which has high false positive rate (0.7222) and lower F-score (0.4348). Multilayer Perceptron algorithm gives an accuracy of 0.9991 and F-score of 0.8196 which is higher than previously mentioned algorithms. However, False Positive rate is much higher (0.3056), which is a limitation for intrusion detection frameworks. Compared to these algorithms, Linear Model Tree (LMT) gives better result in detecting sensor sensor-based attacks. This evaluation indicates that LMT provides an accuracy of 0.9997 and F-score of 0.964.

TABLE 5

Comparison between different machine learning techniques in WEKA.

| Algorithms | Recall rate | False negative rate | Precision rate | False positive rate | Accuracy | F-score |
|---|---|---|---|---|---|---|
| PART | 0.9998 | 0.0002 | 0.6528 | 0.3472 | 0.99 | 0.7899 |
| Logistic Function | 0.9997 | 0.0003 | 0.2778 | 0.7222 | 0.998 | 0.4348 |
| J48 | 0.9998 | 0.0002 | 0.6528 | 0.3472 | 0.99 | 0.7899 |
| LMT | 0.9998 | 0.0002 | 0.9306 | 0.0694 | 0.9997 | 0.964 |
| Hoeffding Tree | 1 | 0 | 0.0556 | 0.9444 | 0.9978 | 0.1053 |
| Multilayer Perceptron | 0.9998 | 0.0002 | 0.6944 | 0.3056 | 0.9991 | 0.8196 |

A comparison between the three approaches is summarized for defending against sensor-based threats. For all the approaches, the best possible case is selected and their performance metrics is summarized in Table 6.

TABLE 6

Comparison between different proposed approaches
(Markov Chain, Naive Bayes, and LMT).

| Performance Metrics | Markov Chain | Naive Bayes | LMT |
|---|---|---|---|
| Recall rate | 0.98 | 1 | 0.9998 |
| False Negative Rate | 0.02 | 0 | 0.0002 |
| Precision rate | 1 | 0.7 | 0.9306 |
| False positive rate | 0 | 0.3 | 0.0694 |
| Accuracy | 0.9833 | 0.9492 | 0.9997 |
| F-Score | 0.9899 | 0.8235 | 0.964 |
| auPRC | 0.947 | 0.686 | 0.91 |

For Markov Chain-based detection, it is chosen three consecutive malicious states as valid device condition. On the other hand, in Naive Bayes approach, the best performance is observed for the threshold 60%. For the WEKA analysis, it is chosen LMT as it gives highest accuracy among other machine learning algorithms. These results indicate that LMT provides highest accuracy and F-score compared to the other two approaches. On the contrary, Naive Bayes model displays higher recall rate and less False Negative rate than other approaches. However, the presence of False Positive rate in IDS is a serious security threat to the system since False Positive refers to malicious attacks that are identified as valid state which is a threat to user privacy and security of the device. Both Markov Chain and LMT has lower false positive rate. Considering F-score and accuracy of all three approaches, we conclude that LMT performs better.

It should be understood that the examples and embodiments described herein are for illustrative purposes only and that various modifications or changes in light thereof will be suggested to persons skilled in the art and are to be included within the spirit and purview of this application.

All patents, patent applications, provisional applications, and publications referred to or cited herein (including those in the "References" section) are incorporated by reference in their entirety, including all figures and tables, to the extent they are not inconsistent with the explicit teachings of this specification.

REFERENCES

[1] U.S. smartphone use in 2015. http://www.pewinternet.org/2015/04/01/us-smartphone-use-in-2015/, April 2015.
[2] A week in the life analysis of smartphone users. http://www.pewinternet.org/2015/04/01/, April 2015.
[3] Analyzing the power consumption of mobile antivirus software on android devices. http://drshem.com/2015/11/08/, August 2016.
[4] Android antivirus protection: Security steps you should take. http://us.norton.com/Android-Anti-Virus-Protection/article, September 2016.
[5] Smartphone OS market share, 2016 q2. http://www.idc.com/prodserv/smartphone-os-market-share.jsp, August 2016.
[6] Smartphone vendor market share, 2016 q2. http://www.idc.com/prodserv/smartphone-market-share.jsp, August 2016.
[7] AL-HAIQI, A., ISMAIL, M., AND NORDIN, R. Keystrokes inference attack on android: A comparative evaluation of sensors and their fusion. Journal of ICT Research and Applications 7, 2 (2013), 117-136.
[8] ASONOV, D., AND AGRAWAL, R. Keyboard acoustic emanations. In Security and Privacy, 2004. Proceedings. 2004 IEEE Symposium on (May 2004), pp. 3-11.
[9] AVIL'E S-ARRIAGA, H., SUCAR-SUCCAR, L., MENDOZADUR 'A N, C., AND PINEDA-CORT'ES, L. A comparison of dynamic naive bayesian classifiers and hidden markov models for gesture recognition. Journal of applied research and technology 9, 1 (2011), 81-102.
[10] AVIV, A. J., SAPP, B., BLAZE, M., AND SMITH, J. M. Practicality of accelerometer side channels on smartphones. In Proceedings of the 28th Annual Computer Security Applications Conference (New York, N.Y., USA, 2012), ACSAC '12, ACM, pp. 41-50.
[11] BROOKS, S., GELMAN, A., JONES, G., AND MENG, X.-L. Handbook of Markov Chain Monte Carlo. CRC press, 2011.
[12] BUGIEL, S., DAVI, L., DMITRIENKO, A., HEUSER, S., SADEGHI, A.-R., AND SHASTRY, B. Practical and lightweight domain isolation on android. In Proceedings of the 1st ACM workshop on Security and privacy in smartphones and mobile devices (2011), ACM, pp. 51-62.
[13] CAI, L., AND CHEN, H. Touchlogger: Inferring keystrokes on touch screen from smartphone motion. In Proceedings of the $6^{th}$ USENIX Conference on Hot Topics in Security (Berkeley, Calif., USA, 2011), HotSec'11, USENIX Association, pp. 9-9.
[14] CAI, L., AND CHEN, H. On the practicality of motion based keystroke inference attack. Springer, 2012.
[15] CHAN, M., CAMPO, E., EST'EVE, D., AND FOURNIOLS, J.-Y. Smart homes—current features and future perspectives. Maturitas 64, 2 (2009), 90-97.
[16] COFFED, J. The threat of gps jamming: The risk to an information utility. Report of EXELIS, Jan. Chicago (2014).
[17] DAHL, G. E., STOKES, J. W., DENG, L., AND YU, D. Largescale malware classification using random projections and neural networks. In Acoustics, Speech and Signal Processing (ICASSP), 2013 IEEE International Conference on (2013), IEEE, pp. 3422-3426.
[18] DIAO, W., LIU, X., ZHOU, Z., AND ZHANG, K. Your voice assistant is mine: How to abuse speakers to steal information and control your phone. In Proceedings of the 4th ACM Workshop on Security and Privacy in Smartphones & Mobile Devices (New York, N.Y., USA, 2014), SPSM '14, ACM, pp. 63-74.
[19] ENCK, W., GILBERT, P., HAN, S., TENDULKAR, V., CHUN, B.-G., COX, L. P., JUNG, J., MCDANIEL, P., AND SHETH, A. N. Taintdroid: An information-flow tracking system for realtime privacy monitoring on smartphones. ACM Trans. Comput. Syst. 32, 2 (June 2014), 5:1-5:29.
[20] FAROOQI, A. H., KHAN, F. A., WANG, J., AND LEE, S. A novel intrusion detection framework for wireless sensor networks. Personal and ubiquitous computing 17, 5 (2013), 907-919.
[21] FOO KUNE, D., AND KIM, Y. Timing attacks on pin input devices. In Proceedings of the 17th ACM Conference on Computer and Communications Security (New York, N.Y., USA, 2010), CCS '10, ACM, pp. 678-680.
[22] GU, G., PORRAS, P. A., YEGNESWARAN, V., FONG, M. W., AND LEE, W. Bothunter: Detecting malware infection through ids-driven dialog correlation. In Usenix Security (2007), vol. 7, pp. 1-16.

[23] HALEVI, T., AND SAXENA, N. A closer look at keyboard acoustic emanations: Random passwords, typing styles and decoding techniques. In Proceedings of the 7th ACM Symposium on Information, Computer and Communications Security (New York, N.Y., USA, 2012), ASIACCS '12, ACM, pp. 89-90.

[24] HALL, M., FRANK, E., HOLMES, G., PFAHRINGER, B., REUTEMANN, P., AND WITTEN, I. H. The weka data mining software: an update. ACM SIGKDD explorations newsletter 11, 1 (2009), 10-18.

[25] HASAN, R., SAXENA, N., HALEVIZ, T., ZAWOAD, S., AND RINEHART, D. Sensing-enabled channels for hard-to-detect command and control of mobile devices. In Proceedings of the 8th ACM SIGSAC Symposium on Information, Computer and Communications Security (New York, N.Y., USA, 2013), ASIA CCS '13, ACM, pp. 469-480.

[26] HILTY, M., PRETSCHNER, A., BASIN, D., SCHAEFER, C., AND WALTER, T. A policy language for distributed usage control. In European Symposium on Research in Computer Security (2007), Springer, pp. 531-546.

[27] IOANNIS, K., DIMITRIOU, T., AND FREILING, F. C. Towards intrusion detection in wireless sensor networks. In Proc. of the 13th European Wireless Conference (2007), pp. 1-10.

[28] JANA, S., NARAYANAN, A., AND SHMATIKOV, V. A scanner darkly: Protecting user privacy from perceptual applications. In Security and Privacy (SP), 2013 IEEE Symposium on (2013), IEEE, pp. 349-363.

[29] JANG, Y., SONG, C., CHUNG, S. P., WANG, T., AND LEE, W. A11y attacks: Exploiting accessibility in operating systems. In Proceedings of the 2014 ACM SIGSAC Conference on Computer and Communications Security (2014), ACM, pp. 103-115.

[30] JHA, S., TAN, K. M., AND MAXION, R. A. Markov chains, classifiers, and intrusion detection. In csfw (2001), vol. 1, Citeseer, p. 206.

[31] JOY PERSIAL, G., PRABHU, M., AND SHANMUGALAKSHMI, R. Side channel attack-survey. Int J Adva Sci Res Rev 1,4 (2011), 54-57.

[32] KEILSON, J. Markov chain models—rarity and exponentiality, vol. 28. Springer Science & Business Media, 2012.

[33] KRUEGEL, C., MUTZ, D., ROBERTSON, W., AND VALEUR, F. Bayesian event classification for intrusion detection. In Computer Security Applications Conference, 2003. Proceedings. $19^{th}$ Annual (2003), IEEE, pp. 14-23.

[34] LANE, N. D., MILUZZO, E., LU, H., PEEBLES, D., CHOUDHURY, T., AND CAMPBELL, A. T. A survey of mobile phone sensing. IEEE Communications Magazine 48, 9 (September 2010), 140-150.

[35] LANE, N. D., XU, Y., LU, H., HU, S., CHOUDHURY, T., CAMPBELL, A. T., AND ZHAO, F. Enabling large-scale human activity inference on smartphones using community similarity networks (csn). In Proceedings of the 13th international conference on Ubiquitous computing (2011), ACM, pp. 355-364.

[36] LEI, L., WANG, Y., ZHOU, J., ZHA, D., AND ZHANG, Z. A threat to mobile cyber-physical systems: Sensor-based privacy theft attacks on android smartphones. In Trust, Security and Privacy in Computing and Communications (TrustCom), 2013 $12^{th}$ IEEE International Conference on (July 2013), pp. 126-133.

[37] LINDA, O., VOLLMER, T., AND MANIC, M. Neural network based intrusion detection system for critical infrastructures. In Neural Networks, 2009. IJCNN 2009. International Joint Conference on (2009), IEEE, pp. 1827-1834.

[38] MACIAS, E., SUAREZ, A., AND LLORET, J. Mobile sensing systems. Sensors 13, 12 (2013), 17292.

[39] MAITI, A., JADLIWALA, M., HE, J., AND BILOGREVIC, I. (smart) watch your taps: side-channel keystroke inference attacks using smartwatches. In Proceedings of the 2015 ACM International Symposium on Wearable Computers (2015), ACM, pp. 27-30.

[40] MENG, W., LEE, W. H., MURALI, S., AND KRISHNAN, S. Charging me and i know your secrets!: Towards juice filming attacks on smartphones. In Proceedings of the 1st ACM Workshop on Cyber-Physical System Security (New York, N.Y., USA, 2015), CPSS '15, ACM, pp. 89-98.

[41] MICHALEVSKY, Y., BONEH, D., AND NAKIBLY, G. Gyrophone: Recognizing speech from gyroscope signals. In $23^{rd}$ USENIX Security Symposium (USENIX Security 14) (San Diego, Calif., August 2014), USENIX Association, pp. 1053-1067.

[42] MILETTE, G., AND STROUD, A. Professional Android sensor programming. John Wiley & Sons, 2012.

[43] MILUZZO, E., VARSHAVSKY, A., BALAKRISHNAN, S., AND CHOUDHURY, R. R. Tapprints: Your finger taps have fingerprints. In Proceedings of the 10th International Conference on Mobile Systems, Applications, and Services (New York, N.Y., USA, 2012), MobiSys '12, ACM, pp. 323-336.

[44] MOHAMED, M., SHRESTHA, B., AND SAXENA, N. Smashed: Sniffing and manipulating android sensor data for offensive purposes. IEEE Transactions on Information Forensics and Security PP, 99 (2016), 1-1.

[45] MOLAY, D., KOUNG, F.-H., AND TAM, K. Learning characteristics of smartphone users from accelerometer and gyroscope data.

[46] MUKHERJEE, S., AND SHARMA, N. Intrusion detection using naive bayes classifier with feature reduction. Procedia Technology 4 (2012), 119-128.

[47] MURPHY, K. P. Naive bayes classifiers. University of British Columbia (2006).

[48] NARAIN, S., SANATINIA, A., AND NOUBIR, G. Single-stroke language-agnostic keylogging using stereo-microphones and domain specific machine learning. In Proceedings of the 2014 ACM Conference on Security and Privacy in Wireless & Mobile Networks (New York, N.Y., USA, 2014), WiSec '14, ACM, pp. 201-212.

[49] NGUYEN, T. Using unrestricted mobile sensors to infer tapped and traced user inputs. In Information Technology-New Generations (ITNG), 2015 12th International Conference on (April 2015), pp. 151-156.

[50] OWUSU, E., HAN, J., DAS, S., PERRIG, A., AND ZHANG, J. Accessory: password inference using accelerometers on smartphones. In Proceedings of the Twelfth Workshop on Mobile Computing Systems & Applications (2012), ACM, p. 9.

[51] PANDA, M., AND PATRA, M. R. Network intrusion detection using naive bayes. International journal of computer science and network security 7, 12 (2007), 258-263.

[52] PARK, B.-W., AND LEE, K. C. The Effect of Users' Characteristics and Experiential Factors on the Compulsive Usage of the Smartphone. Springer Berlin Heidelberg, Berlin, Heidelberg, 2011.

[53] PEIRAVIAN, N., AND ZHU, X. Machine learning for android malware detection using permission and api calls.

In Tools with Artificial Intelligence (ICTAI), 2013 IEEE 25th International Conference on (2013), IEEE, pp. 300-305.

[54] PETRACCA, G., SUN, Y., JAEGER, T., AND ATAMLI, A. Audroid: Preventing attacks on audio channels in mobile devices. In Proceedings of the 31st Annual Computer Security Applications Conference (New York, N.Y., USA, 2015), ACSAC 2015, ACM, pp. 181-190.

[55] PING, D., SUN, X., AND MAO, B. Textlogger: Inferring longer inputs on touch screen using motion sensors. In Proceedings of the 8th ACM Conference on Security & Privacy in Wireless and Mobile Networks (New York, N.Y., USA, 2015), WiSec '15, ACM, pp. 24:1-24:12.

[56] PONGALIUR, K., ABRAHAM, Z., LIU, A. X., XIAO, L., AND KEMPEL, L. Securing sensor nodes against side channel attacks. In High Assurance Systems Engineering Symposium, 2008. HASE 2008. 11th IEEE (2008), IEEE, pp. 353-361.

[57] POSLAD, S. Ubiquitous computing: smart devices, environments and interactions. John Wiley & Sons, 2011.

[58] ROESNER, F., KOHNO, T., MOSHCHUK, A., PARNO, B., WANG, H. J., AND COWAN, C. User-driven access control: Rethinking permission granting in modern operating systems. In 2012 IEEE Symposium on Security and Privacy (2012), IEEE, pp. 224-238.

[59] SAHS, J., AND KHAN, L. A machine learning approach to android malware detection. In Intelligence and security informatics conference (eisic), 2012 european (2012), IEEE, pp. 141-147.

[60] SCHLEGEL, R., ZHANG, K., ZHOU, X.-Y., INTWALA, M., KAPADIA, A., AND WANG, X. Soundcomber: A stealthy and context-aware sound trojan for smartphones. NDSS 11 (2011), 17-33.

[61] SCHMIDT, A.-D., BYE, R., SCHMIDT, H.-G., CLAUSEN, J., KIRAZ, O., YUKSEL, K. A., CAMTEPE, S. A., AND ALBAYRAK, S. Static analysis of executables for collaborative malware detection on android. In Communications, 2009. ICC'09. IEEE International Conference on (2009), IEEE, pp. 1-5.

[62] SHEN, C., PEI, S., YANG, Z., AND GUAN, X. Input extraction via motion-sensor behavior analysis on smartphones. Computers & Security 53 (2015), 143-155.

[63] SHUKLA, D., KUMAR, R., SERWADDA, A., AND PHOHA, V. V. Beware, your hands reveal your secrets! In Proceedings of the 2014 ACM SIGSAC Conference on Computer and Communications Security (New York, N.Y., USA, 2014), CCS '14, ACM, pp. 904-917.

[64] SIMON, L., AND ANDERSON, R. Pin skimmer: Inferring pins through the camera and microphone. In Proceedings of the Third ACM Workshop on Security and Privacy in Smartphones & Mobile Devices (New York, N.Y., USA, 2013), SPSM '13, ACM, pp. 67-78.

[65] SMALLEY, S., AND CRAIG, R. Security enhanced (se) android: Bringing flexible mac to android. In NDSS (2013), vol. 310, pp. 20-38.

[66] SPREITZER, R. Pin skimming: Exploiting the ambient-light sensor in mobile devices. In Proceedings of the 4th ACM Workshop on Security and Privacy in Smartphones & Mobile Devices (New York, N.Y., USA, 2014), SPSM '14, ACM, pp. 51-62.

[67] STANKOVIC, J. A. Wireless sensor networks. computer 41, 10 (2008).

[68] STRIKOS, A. A. A full approach for intrusion detection in wireless sensor networks. School of Information and Communication Technology (2007).

[69] SUBRAMANIAN, V., ULUAGAC, S., CAM, H., AND BEYAH, R. Examining the characteristics and implications of sensor side channels. In Communications (ICC), 2013 IEEE International Conference on (June 2013), pp. 2205-2210.

[70] SUN, M., ZHENG, M., LUI, J. C. S., AND JIANG, X. Design and implementation of an android host-based intrusion prevention system. In Proceedings of the 30th Annual Computer Security Applications Conference (New York, N.Y., USA, 2014), ACSAC '14, ACM, pp. 226-235.

[71] TIPPENHAUER, N. O., P̈ OPPER, C., RASMUSSEN, K. B., AND CAPKUN, S. On the requirements for successful gps spoofing attacks. In Proceedings of the 18th ACM conference on Computer and communications security (2011), ACM, pp. 75-86.

[72] ULUAGAC, A., SUBRAIVIANIAN, V., AND BEYAH, R. Sensory channel threats to cyber physical systems: A wake-up call. In Communications and Network Security (CNS), 2014 IEEE Conference on (October 2014), pp. 301-309.

[73] WANG, X., YANG, Y., ZENG, Y., TANG, C., SHI, J., AND XU, K. A novel hybrid mobile malware detection system integrating anomaly detection with misuse detection. In Proceedings of the 6th International Workshop on Mobile Cloud Computing and Services (New York, N.Y., USA, 2015), MCS '15, ACM, pp. 15-22.

[74] WU, W.-C., AND HUNG, S.-H. Droiddolphin: A dynamic android malware detection framework using big data and machine learning. In Proceedings of the 2014 Conference on Research in Adaptive and Convergent Systems (New York, N.Y., USA, 2014), RACS '14, ACM, pp. 247-252.

[75] XU, Z., BAI, K., AND ZHU, S. Taplogger: Inferring user inputs on smartphone touchscreens using on-board motion sensors. In Proceedings of the Fifth ACM Conference on Security and Privacy in Wireless and Mobile Networks (New York, N.Y., USA, 2012), WISEC '12, ACM, pp. 113-124.

[76] XU, Z., AND ZHU, S. Semadroid: A privacy-aware sensor management framework for smartphones. In Proceedings of the $5^{th}$ ACM Conference on Data and Application Security and Privacy (New York, N.Y., USA, 2015), CODASPY '15, ACM, pp. 61-72.

[77] YE, N., ET AL. A markov chain model of temporal behavior for anomaly detection. In Proceedings of the 2000 IEEE Systems, Man, and Cybernetics Information Assurance and Security Workshop (2000), vol. 166, West Point, N.Y., p. 169.

[78] YE, Y., WANG, D., LI, T., AND YE, D. Imds: Intelligent malware detection system. In Proceedings of the 13th ACM SIGKDD international conference on Knowledge discovery and data mining (2007), ACM, pp. 1043-1047.

[79] YU, Y., WANG, J., AND ZHOU, G. The exploration in the education of professionals in applied internet of things engineering. In Distance Learning and Education (ICDLE), 2010 4th International Conference on (October 2010), pp. 74-77.

[80] YU, Z., AND TSAI, J. J. A framework of machine learning based intrusion detection for wireless sensor networks. In Sensor Networks, Ubiquitous and Trustworthy Computing, 2008. SUTC'08. IEEE International Conference on (2008), IEEE, pp. 272-279.

[81] ZHUANG, L., ZHOU, F., AND TYGAR, J. D. Keyboard acoustic emanations revisited. ACM Trans. Inf. Syst. Secur. 13, 1 (November 2009), 3:1-3:26.

What is claimed is:

1. A context-aware intrusion detector, comprising:
a board;
a plurality of no-permission imposed sensors integrated with the board and a plurality of permission imposed sensors integrated with the board; and
an integrated chip implemented on the board,
the plurality of no-permission imposed sensors comprising an accelerometer, a gyroscope, and a light sensor, and the plurality of permission imposed sensors comprising a microphone, a speaker, a camera, and a global positioning system (GPS) sensor,
the integrated chip comprising:
a sensor data collector configured to receive numerical values from the plurality of no-permission imposed sensors and to receive a respective state from each permission imposed sensor of the plurality of permission imposed sensors, each respective state being an on-state if a user has turned the respective sensor on or an off-state if the user has not turned the respective sensor on;
a data processor configured to merge the numerical values and the respective states, and to create an input matrix; and
a data analyzer configured to differentiate a malicious behavior on a smart device from a normal behavior based on the input matrix using an analytical model, the analytical model comprising at least one of a Markov chain, a Naïve Bayes technique, a decision tree algorithm, a Bayesian network, and a support vector machine,
the data analyzer being trained to distinguish a specific user activity, based on a context of data received from each permission imposed sensor of the plurality of permission imposed sensors and each no-permission imposed sensor of the plurality of no-permission imposed sensors, from among a plurality of user activities,
the plurality of user activities comprising walking, talking, playing a game, browsing an internet application, listening to music, video calling, driving as a driver, and driving as a passenger,
the data analyzer being configured to generate a trusted model and a threat model based on the training,
the data processor being configured to take the respective numerical values received from each no-permission imposed sensor of the plurality of no-permission imposed sensors in a predetermined time and calculate a respective average value thereof, and
the data analyzer differentiating malicious behavior from normal behavior based on the input matrix by determining a device state, based on the context of data received from each permission imposed sensor of the plurality of permission imposed sensors and each no-permission imposed sensor of the plurality of no-permission imposed sensors, and then determining if the device state falls within the trusted model indicating normal behavior or within the threat model indicating malicious behavior.

2. The context-aware intrusion detector according to claim 1, the plurality of no-permission imposed sensors further comprising a proximity sensor.

3. The context-aware intrusion detector according to claim 2, the plurality of permission imposed sensors further comprising a headphone.

4. The context-aware intrusion detector according to claim 3, the sensor data collector comprising a sensor value collector connected to the plurality of no-permission imposed sensors and a sensor logic state detector connected to the plurality of permission imposed sensors, and the sensor data collector observing changes in the numerical values and the respective states.

5. The context-aware intrusion detector according to claim 4, the sensor logic state detector determining each respective state and providing a 0 for on-state and a 1 for off-state.

6. The context-aware intrusion detector according to claim 5, the data processor taking the respective numerical values received from each no-permission imposed sensor of the plurality of no-permission imposed sensors, sampling according to a sample frequency of the respective no-permission imposed sensor, and calculating the respective average value.

7. The context-aware intrusion detector according to claim 1, the predetermined time being one second.

8. A context-aware intrusion detection method using a context-aware intrusion detector, the context-aware intrusion detector comprising:
a board;
a plurality of no-permission imposed sensors integrated with the board and a plurality of permission imposed sensors integrated with the board; and
an integrated chip implemented on the board,
the plurality of no-permission imposed sensors comprising an accelerometer, a gyroscope, and a light sensor, and the plurality of permission imposed sensors comprising a microphone, a speaker, a camera, and a GPS sensor,
the method comprising:
providing numerical values from the plurality of no-permission imposed sensors and a respective state from each permission imposed sensor of the plurality of permission imposed sensors, each respective state being an on-state is a user has turned the respective sensor on or an off-state if the user has not turned the respective sensor on;
receiving the numerical values and the respective states, by a sensor data collector of the integrated chip;
merging the numerical values and the respective states, by a data processor of the integrated chip;
creating an input matrix, by the data processor;
training a data analyzer of the integrated chip to distinguish a specific user activity, based on a context of data received from each permission imposed sensor of the plurality of permission imposed sensors and each no-permission imposed sensor of the plurality of no-permission imposed sensors, from among a plurality of user activities,
generating, by the data analyzer, a trusted model and a threat model based on the training; and
differentiating a malicious behavior on a smart device from a normal behavior based on the input matrix, by the data analyzer, using an analytical model, the analytical model comprising at least one of a Markov chain, a Naïve Bayes technique, a decision tree algorithm, a Bayesian network, and a support vector machine,
the plurality of user activities comprising walking, talking, playing a game, browsing an internet application, listening to music, video calling, driving as a driver, and driving as a passenger,
the data processor taking the respective numerical values received from the each no-permission imposed sensor of the plurality of no-permission imposed sensors in a predetermined time and calculating a respective average value thereof, and the differentiating a malicious behavior on a smart device from a normal behavior comprising determining a device state, based on the context of data received from each permission imposed sensor of the plurality of permission imposed sensors and each no-permission imposed sensor of the plurality of no-permission imposed sensors, and then determining if the device state falls within the trusted model indicating normal behavior or within the threat model indicating malicious behavior.

9. The method according to claim 8, the plurality of no-permission imposed sensors further comprising a proximity sensor.

10. The method according to claim 9, the plurality of permission imposed sensors further comprising a headphone.

11. The method according to claim 10, the receiving the numerical values being performed by a sensor value collector connected to the plurality of no-permission imposed sensors, and the receiving the respective states being performed by a sensor logic state detector connected to the plurality of permission imposed sensors.

12. The method according to claim 8, the predetermined time being one second.

13. The method according to claim 8, the sensor logic state detector determining each respective state and providing a 0 for on-state and a 1 for off-state.

14. The method according to claim 8, the data processor taking the respective numerical values received from each no-permission imposed sensor of the plurality of no-permission imposed sensors, sampling according to a sample frequency of the respective no-permission imposed sensor, and calculating the respective average value.

15. A smart system, comprising:
a board;
a plurality of no-permission imposed sensors integrated with the board and a plurality of permission imposed sensors integrated with the board; and
an integrated chip implemented on the board,
the plurality of permission imposed comprising an accelerometer, a gyroscope, and a light sensor, and the plurality of no permission imposed sensors comprising a microphone, a speaker, a camera, and a GPS sensor,
the integrated chip comprising:
a sensor data collector connected to the plurality of no-permission imposed sensors and the plurality of permission imposed sensors, and configured to receive numerical values from the plurality of no-permission imposed sensors and to receive a respective state from each permission imposed sensor of the plurality of permission imposed sensors, each respective state being an on-state if a user has turned the respective sensor on or an off-state if the user has not turned the respective sensor on;
a data processor connected to the sensor data collector, and configured to merge the numerical values and the respective states, and to create an input matrix; and
a data analyzer connected to the data processor, and configured to differentiate a malicious behavior on the smart system from a normal behavior based on the input matrix using an analytical model, the analytical model comprising at least one of a Markov chain, a Naïve Bayes technique, a decision tree algorithm, a Bayesian network, and a support vector machine, the data processor being further configured to sample data, received from the plurality of no-permission imposed sensors, with respective associated sensor frequency, the data analyzer being trained to distinguish a specific user activity, based on a context of data received from each permission imposed sensor of the plurality of permission imposed sensors and each no-permission imposed sensor of the plurality of no-permission imposed sensors, from among a plurality of user activities, the plurality of user activities comprising walking, talking, playing a game, browsing an internet application, listening to music, video calling, driving as a driver, and driving as a passenger, the data analyzer being configured to generate a trusted model and a threat model based on the training, the data processor being configured to take the respective numerical values from each no-permission imposed sensor of the plurality of no-permission imposed sensors in a predetermined time and calculate a respective average value thereof, and the data analyzer differentiating malicious behavior from normal behavior based on the input matrix by determining a device state, based on the context of data received from each permission imposed sensor of the plurality of permission imposed sensors and each no-permission imposed sensor of the plurality of no-permission imposed sensors, and then determining if the device state falls within the trusted model indicating normal behavior or within the threat model indicating malicious behavior.

16. The smart system according to claim 15, the predetermined time being one second.

* * * * *